(12) United States Patent
Jain et al.

(10) Patent No.: US 11,886,803 B1
(45) Date of Patent: Jan. 30, 2024

(54) ASSISTIVE DIGITAL FORM AUTHORING

(71) Applicant: Adobe Inc., San Jose, CA (US)

(72) Inventors: Arneh Jain, Calicut (IN); Salil Taneja, Noida (IN); Puneet Mangla, Faridabad (IN); Gaurav Ahuja, Delhi (IN)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 18/153,595

(22) Filed: Jan. 12, 2023

(51) Int. Cl.
*G06F 17/00* (2019.01)
*G06F 40/174* (2020.01)
*G06F 40/40* (2020.01)

(52) U.S. Cl.
CPC .......... *G06F 40/174* (2020.01); *G06F 40/40* (2020.01)

(58) Field of Classification Search
CPC ............................ G06F 40/174; G06F 40/40
See application file for complete search history.

(56) References Cited

U.S. PATENT DOCUMENTS

| | | | | |
|---|---|---|---|---|
| 11,151,313 | B2* | 10/2021 | Chua ................... | G06F 16/93 |
| 2004/0268236 | A1* | 12/2004 | Chidlovskii .......... | G06F 40/16 |
| | | | | 715/234 |
| 2020/0210520 | A1* | 7/2020 | Akyamac .............. | G06F 40/177 |
| 2022/0083523 | A1* | 3/2022 | Ben-Aharon ......... | G06F 8/34 |
| 2023/0115185 | A1* | 4/2023 | Huang .................. | G06F 8/33 |
| | | | | 715/762 |
| 2023/0139614 | A1* | 5/2023 | Risuleo ................ | G06F 40/284 |
| | | | | 715/224 |

OTHER PUBLICATIONS

Li, Yang, et al. "Widget captioning: Generating natural language description for mobile user interface elements." arXiv preprint arXiv:2010.04295 (2020) (Year: 2020).*
Bunian, Sara, et al. "Vins: Visual search for mobile user interface design." Proceedings of the 2021 CHI Conference on Human Factors in Computing Systems. 2021 (Year: 2021).*

* cited by examiner

*Primary Examiner* — Andrew T McIntosh
(74) *Attorney, Agent, or Firm* — FIG. 1 Patents

(57) ABSTRACT

In implementations of systems for assistive digital form authoring, a computing device implements an authoring system to receive input data describing a search input associated with a digital form. The authoring system generates an input embedding vector that represents the search input in a latent space using a machine learning model trained on training data to generate embedding vectors in the latent space. A candidate embedding vector included in a group of candidate embedding vectors is identified based on a distance between the input embedding vector and the candidate embedding vector in the latent space. The authoring system generates an indication of a search output associated with the digital form for display in a user interface based on the candidate embedding vector.

19 Claims, 19 Drawing Sheets

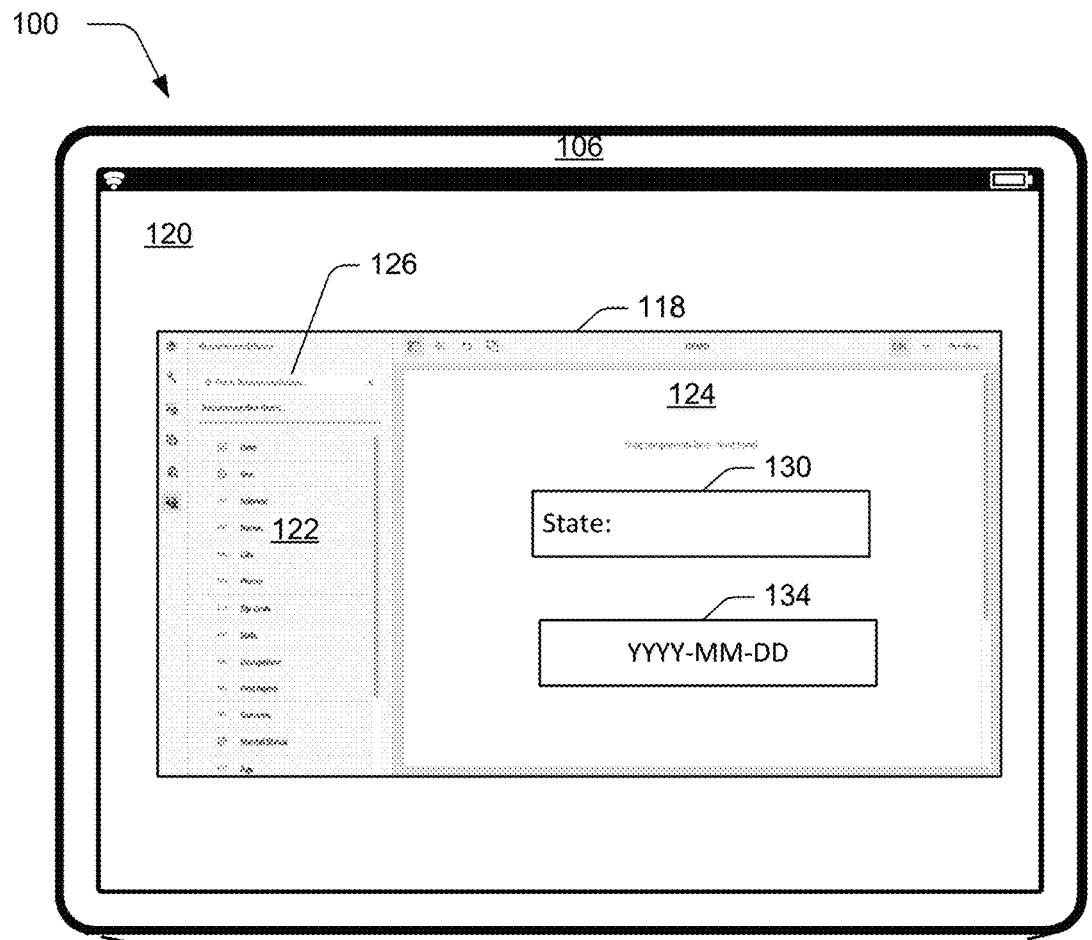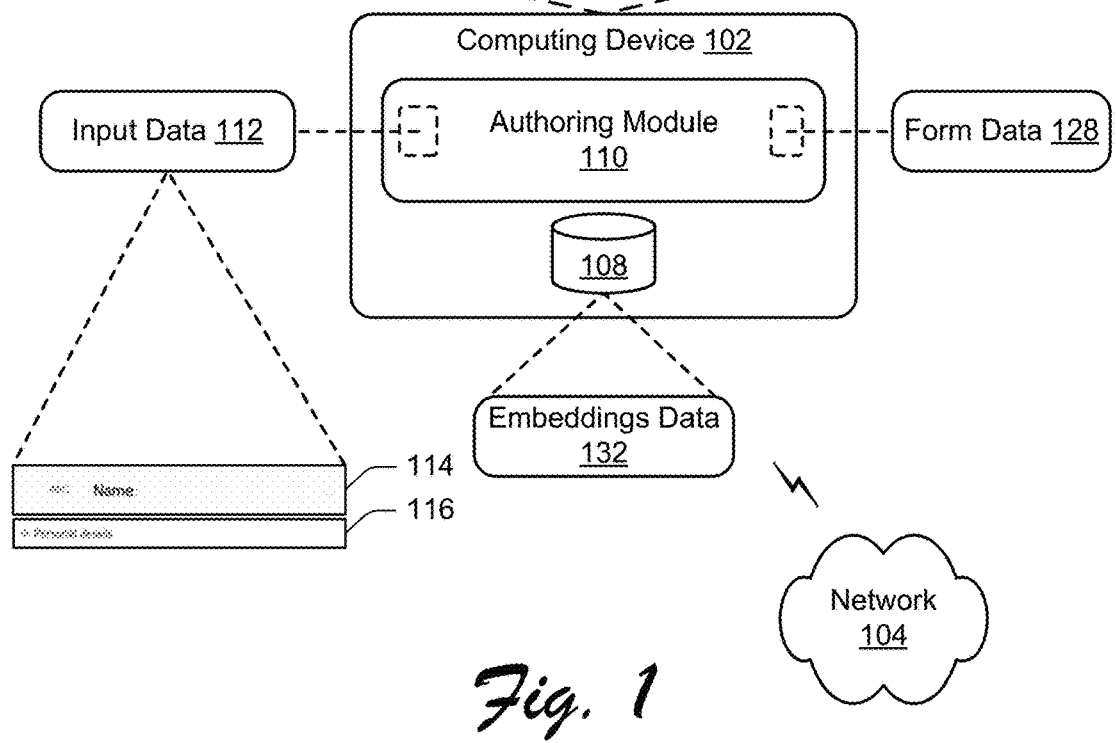
Fig. 1

ASSISTIVE DIGITAL FORM AUTHORING

BACKGROUND

A digital form is authored by a user interacting with an input device (e.g., a mouse, a stylus, a touchscreen, etc.) relative to a user interface to add form elements to the digital form such as fields and fragments. The fields are capable of receiving information, e.g., textboxes, and the fragments are groups of fields which are frequently reused across multiple forms, e.g., a "Contact Details" block. Once the digital form is authored, the form is usable to collect and store information from many different domains.

SUMMARY

Techniques and systems for assistive digital form authoring are described. In a first example, a computing device implements an authoring system to receive input data describing a search input associated with a digital form. In a second example, the authoring system receives the input data describing a form element included in the digital form.

In the first example, the authoring system generates an input embedding vector that represents the search input in a latent space using a machine learning model trained on training data to generate embedding vectors in the latent space. A candidate embedding vector included in a group of candidate embedding vectors is identified based on a distance between the input embedding vector and the candidate embedding vector in the latent space. The authoring system generates an indication of a search output associated with the digital form for display in a user interface based on the candidate embedding vector.

In the second example, the authoring system represents the digital form as a sequence of elements. In this example, the authoring system identifies an additional form element based on the sequence of elements and the form element using a collaborative filtering model trained using additional training data to identify form elements for digital forms. An indication of the additional form element is generated for display in the user interface.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

FIG. 1 is an illustration of an environment in an example implementation that is operable to employ digital systems and techniques for assistive digital form authoring as described herein.

FIGS. 3A, 3B, 3C, and 3D illustrate examples of generating indications of form elements based on form elements included in a digital form.

FIGS. 5A, 5B, 5C, 5D, 5E, 5F, and 5G illustrate examples of generating indications of search outputs based on search inputs associated with a digital form.

DETAILED DESCRIPTION

Overview

Figure 2:
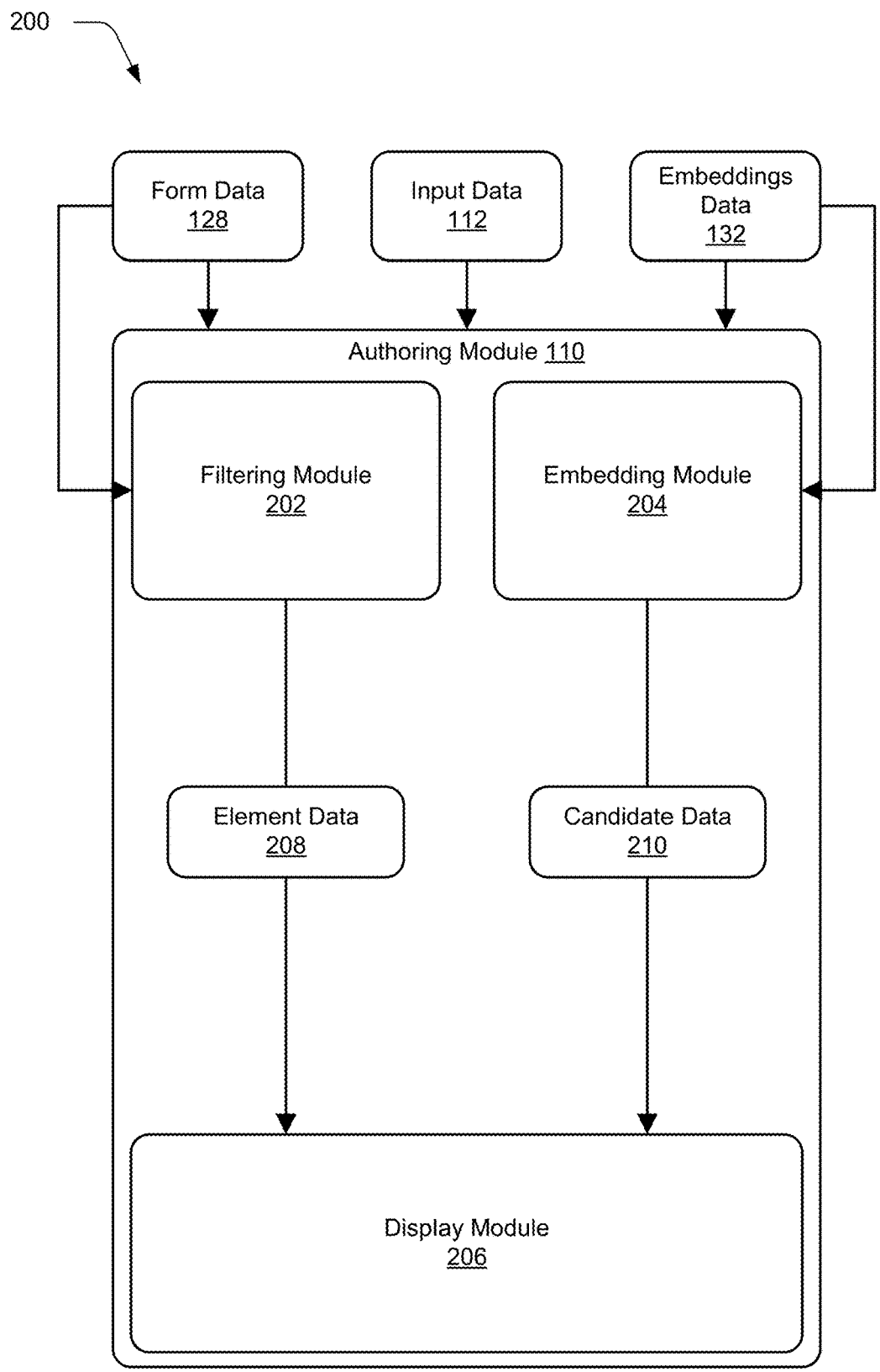
FIG. 2 depicts a system in an example implementation showing operation of an authoring module for assistive digital form authoring.

In order to author a digital form using conventional systems, a user interacts with an input device (e.g., a stylus, a touchscreen, a mouse, a keyboard, etc.) relative to an authoring interface to identify user interface components of the authoring interface that represent particular fields and fragments. For instance, the user manually identifies the user interface components through several interactions with various menus and submenus of the authoring interface. The user then manipulates the input device relative to authoring interface to add the identified user interface components to an editing panel of the authoring interface which causes the particular fields and fragments represented by the user interface components to be added to the digital form. However, manually identifying the user interface components via the various menus and submenus of the authoring interface is time consuming and inefficient.

To overcome these limitations, techniques and systems for assistive digital form authoring are described. In an example, a computing device implements an authoring system to receive input data describing an interaction relative to a digital form being authored in the authoring interface. In some examples, the interaction is a search input associated with the digital form. In other examples, the interaction is an inclusion of a form element in the digital form.

In an example in which the authoring system receives the input data as describing the search input associated with the digital form, the authoring system generates an input embedding vector that represents the search input in a latent space using a machine learning model trained on training data to generate embedding vectors in the latent space. In one example, the machine learning model includes a Bidirectional Encoder Representations from Transformers model. The authoring system compares the input embedding vector to candidate embedding vectors included in a group of candidate embedding vectors described by embeddings data.

For example, each of the candidate embedding vectors represents a candidate search output in the latent space and the authoring system generates the candidate embedding vectors by processing the candidate search outputs using the trained machine learning model. The authoring system compares the embedding vectors by computing similarities or distances between the input embedding vector and the candidate embedding vectors in the latent space. In an example, the authoring system computes the similarities as cosine similarities and identifies a set of candidate embedding vectors (e.g., a top 5, a top 10, a top 15, etc.) from the group such that candidate embedding vectors included in the set have a highest similarity with the input embedding vector.

The authoring system generates indications of candidate search outputs represented by the candidate embedding vectors included in the set for display in the authoring interface. In one example, the authoring system generates the indications as user interface components. In this example, the user manipulates the input device relative to the authoring interface to interact with a particular one of the user interface components which adds a corresponding form element to the digital form being authored in the user interface.

In an example in which the authoring system receives the input data as describing a form element included in the digital form (e.g., the corresponding form element of the previous example), the authoring system represents the digital form as a sequence of elements. Elements included in the sequence of elements represent form elements (e.g., fields and/or fragments) that are included in the digital form. For example, the form elements were previously added to the digital form being authored in the authoring interface and the form element is added to the digital form more recently than the form elements.

The authoring system processes the sequence of elements and the form element using a collaborative filtering model based on form data. For instance, the form data describes databases of thousands of digital forms. The collaborative filtering model processes the sequence of elements including the form element and the form data to identify a set of additional form elements. In an example, additional form elements included in the set have not been previously included in the digital form being authored in the authoring interface. In one example, the collaborative filtering model identifies the additional form elements included in the set based on a number of cooccurrences between the form element and the additional form elements in the digital forms described by the form data. In another example, the collaborative filtering model identifies the additional form elements included in the set based on a distance or a closeness between cooccurrences of the form element and ones of the additional form elements in the digital forms described by the form data.

The authoring system generates indications of the additional form elements for display in the authoring interface. For example, the authoring system generates the indications as additional user interface components for display in the authoring interface. The user manipulates the input device relative to the authoring interface to interact with a particular one of the additional user interface components which adds a corresponding form element to the digital form being authored in the user interface.

By generating and displaying indications of candidate search outputs and additional form elements relative to the authoring interface in this manner, the user avoids multiple interactions with various menus and submenus of the authoring interface to identify user interface components usable to add particular form elements to the digital form. This increases efficiency of digital form authoring relative to the time consuming conventional systems. Additionally, computational costs of identifying the candidate search outputs and the additional form elements are minimal such that the described systems are implementable in network-based applications which are capable of identifying candidate search outputs and/or additional form elements in substantially real time.

Term Examples

As used herein, the term "machine learning model" refers to a computer representation that is tunable (e.g., trainable) based on inputs to approximate unknown functions. By way of example, the term "machine learning model" includes a model that utilizes algorithms to learn from, and make predictions on, known data by analyzing the known data to learn to generate outputs that reflect patterns and attributes of the known data. According to various implementations, such a machine learning model uses supervised learning, semi-supervised learning, unsupervised learning, reinforcement learning, and/or transfer learning. For example, the machine learning model is capable of including, but is not limited to, clustering, decision trees, support vector machines, linear regression, logistic regression, Bayesian networks, random forest learning, dimensionality reduction algorithms, boosting algorithms, artificial neural networks (e.g., fully-connected neural networks, deep convolutional neural networks, or recurrent neural networks), deep learning, etc. By way of example, a machine learning model makes high-level abstractions in data by generating data-driven predictions or decisions from the known input data.

As used herein, the term "embedding vector" refers to a numerical representation of an intent or a natural language search query in a latent space. By way of example, embedding vectors for intents/queries and embedding vectors for other intents/queries that are generated by a trained machine learning model are comparable to infer similarities and differences between the intents/queries and the other intents/queries.

In the following discussion, an example environment is first described that employs examples of techniques described herein. Example procedures are also described which are performable in the example environment and other environments. Consequently, performance of the example procedures is not limited to the example environment and the example environment is not limited to performance of the example procedures.

Example Environment

FIG. 1 is an illustration of an environment 100 in an example implementation that is operable to employ digital systems and techniques as described herein. The illustrated environment 100 includes a computing device 102 connected to a network 104. The computing device 102 is configurable as a desktop computer, a laptop computer, a mobile device (e.g., assuming a handheld configuration such as a tablet or mobile phone), and so forth. Thus, the computing device 102 is capable of ranging from a full resource device with substantial memory and processor resources (e.g., personal computers, game consoles) to a low-resource device with limited memory and/or processing resources (e.g., mobile devices). In some examples, the computing device 102 is representative of a plurality of different devices such as multiple servers utilized to perform operations "over the cloud."

The illustrated environment 100 also includes a display device 106 that is communicatively coupled to the computing device 102 via a wired or a wireless connection. A variety of device configurations are usable to implement the computing device 102 and/or the display device 106. For instance, the computing device 102 includes a storage device 108 and an authoring module 110. The authoring module 110 is illustrated as having, receiving, and/or transmitting input data 112.

As shown, the input data 112 describes a form element 114 and a search input 116. The form element 114 is a name field and the search input 116 is a natural language search query for "Personal details." For example, a user generates the input data 112 via interaction with an input device (e.g., a mouse, a stylus, a keyboard, a touchscreen, etc.) relative to an authoring interface 118 which is displayed in a user interface 120 of the display device 106. In this example, the user manipulates the input device relative to the authoring interface 118 to move a user interface component 122 into an editing panel 124 in order to generate the input data 112 as describing the form element 114. Similarly, the user generates the input data 112 as describing the search input 116 by manipulating the input device to enter the natural language search query in a search field 126 of the authoring interface 118.

Consider an example in which the user has limited experience in digital form authoring and the authoring module 110 includes a collaborative filtering model which is capable of accessing form data 128. The form data 128 describes a database of digital forms (or multiple databases of digital forms) which includes a variety of different forms such as government forms, corporate forms, forms authored by the user, forms authored by other users, etc. In some examples, these various forms are tagged or labeled with intent information (e.g., page intent, section intent, etc.) and/or natural language descriptions of fields/fragments included in the forms. For example, the authoring module 110 implements the collaborative filtering model to process the input data 112 and the form data 128 to identify an additional form element 130 which is displayed relative to the authoring interface 118.

To do so in one example, the authoring module 110 flattens a digital form being authored in the authoring interface 118 into a sequence of elements (e.g., with particular entries for container elements) and processes the sequence of elements along with the form element 114 using the collaborative filtering model to identify the additional form element 130 based on the form data 128. Elements included in the sequence of elements correspond to form elements included in the digital form being authored in the authoring interface 118, and the authoring module 110 identifies the additional form element 130 based at least partially on a current state of the digital form being authored in the authoring interface 118. The additional form element 130 is not included in the digital form before being identified by the authoring module 110. In the illustrated example, the digital form being authored is blank and the authoring module 110 identifies the additional form element 130 based on the form element 114 and the form data 128. For instance, the additional form element 130 is statistically common in digital forms described by the form data 128.

In one example, the authoring module 110 implements the collaborative filtering model to identify the additional form element 130 based on a number of cooccurrences of the form element 114 and the additional form element 130 in the digital forms described by the form data 128. In another example, the authoring module 110 uses the collaborative filtering model to identify the additional form element 130 based on a closeness of or a distance between the form element 114 and the additional form element 130 in the digital forms described by the form data 128. In the illustrated example, the authoring module 110 identifies the additional form element 130 as a state field which is statistically likely to follow the name field of the form element 114 based on the form data 128. In an example in which the form element 114 is a fragment (a reusable group of fields such as an address block or legal text), the authoring module 110 identifies the additional form element 130 as a fragment which is statistically likely to follow the form element 114 in the digital forms described by the form data 128.

Consider an example in which the authoring module 110 includes a machine learning model such as a Bidirectional Encoder Representations from Transformers model trained on training data to generate embedding vectors for search inputs and search outputs in a latent space. In this example, the authoring module 110 trains the machine learning model on training data describing pairs of search inputs and corresponding search outputs described by the form data 128 such that an embedding vector generated for a search input is separated by a relatively small distance from an embedding vector generated for a corresponding search output in the latent space. For example, the embedding vector generated for the search input is separated by a relatively large distance in the latent space from an embedding vector generated for a different search output which corresponds to a different search input. In this example, the authoring module 110 trains the machine learning model on the training data using a negative log-likelihood loss.

In one example, the authoring module 110 identifies candidate search outputs for search inputs based on the form data 128. The authoring module 110 implements or causes the trained machine learning model to generate a candidate embedding vector in the latent space for each of the identified candidate search outputs. For instance, the authoring module 110 generates embeddings data 132 as describing the candidate embedding vectors and corresponding candidate search outputs which the authoring module 110 stores on the storage device 108. When the authoring module 110 receives the input data 112 describing the search input 116, the authoring module 110 implements the trained machine learning model to generate an input embedding vector that represents the search input 116 in the latent space.

The authoring module 110 then computes distances between the input embedding vector and the candidate embedding vectors described by the embeddings data 132. For example, the authoring module 110 computes the distances based on a cosine similarity between the input embedding vector that represents the search input 116 and the candidate embedding vectors that represent the candidate search outputs. In this example, the authoring module 110 identifies a candidate embedding vector described by the embeddings data 132 as being separated from the input embedding vector by a smallest distance in the latent space (e.g., a greatest similarity). The identified candidate embedding vector corresponds to a search output 134 which is displayed relative to the authoring interface 118.

As shown, the additional form element 130 is the state field and the search output 134 is a date of birth field. In one example, the search output 134 is also a form element. By precomputing the candidate embedding vectors described by the embeddings data 132 and identifying the search output 134 based on the distances in the latent space, the authoring module 110 is capable of implementing systems for digital form authoring via the network 104. This is because computing the distances in the latent space is a computationally efficient process which is performable in substantially real time in some examples.

The user interacts with the input device relative to the authoring interface 118 to add the additional form element 130 and/or the search output 134 to the digital form being authored in the authoring interface 118. In the example in which the user has limited experience in digital form authoring, identifying the additional form element 130 and the search output 134 is informative based on thousands of digital forms described by the form data 128. However, in an example in which the user has substantial experience in digital form authoring, identifying the additional form element 130 and the search output 134 increases efficiency of digital form authoring by avoiding multiple steps and interactions with the authoring interface 118 to manually identify the additional form element 130 and the search output 134.

FIG. 2 depicts a system 200 in an example implementation showing operation of an authoring module 110. The authoring module 110 is illustrated to include a filtering module 202, an embedding module 204, and a display module 206. As shown, the authoring module 110 receives the input data 112, the form data 128, and the embeddings data 132 as inputs.

Figure 3A:
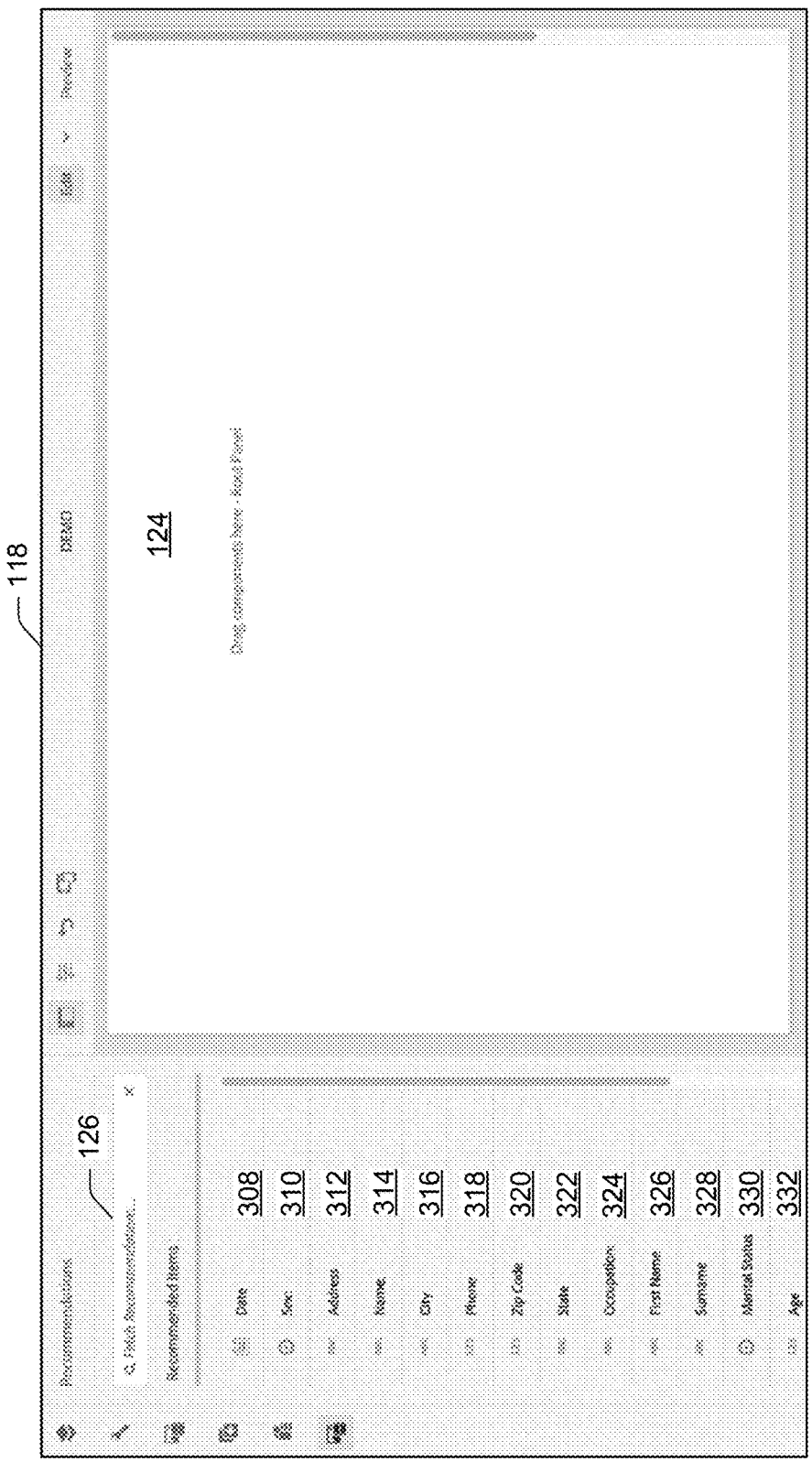
Figure 3B:
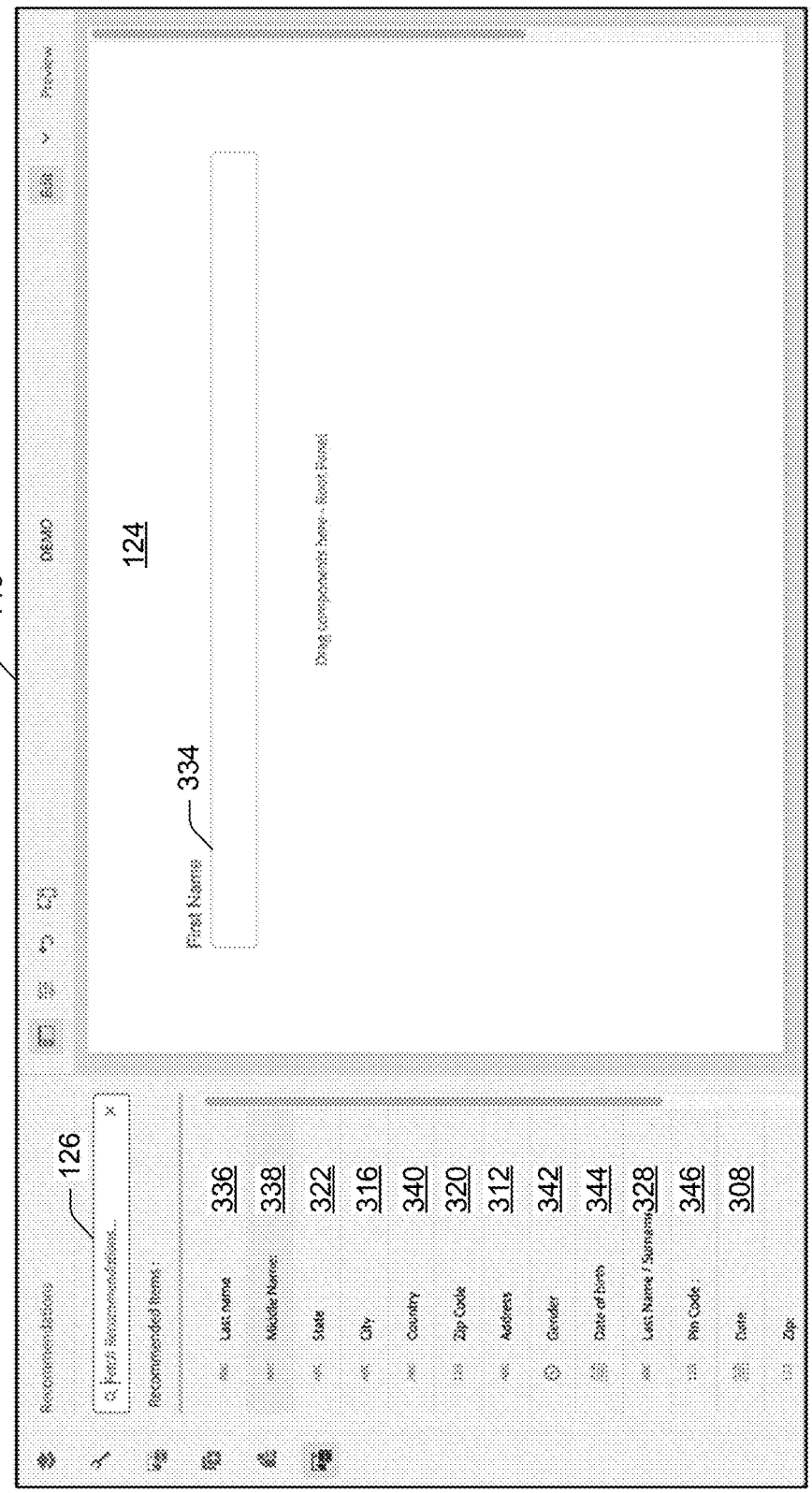
Figure 3C:
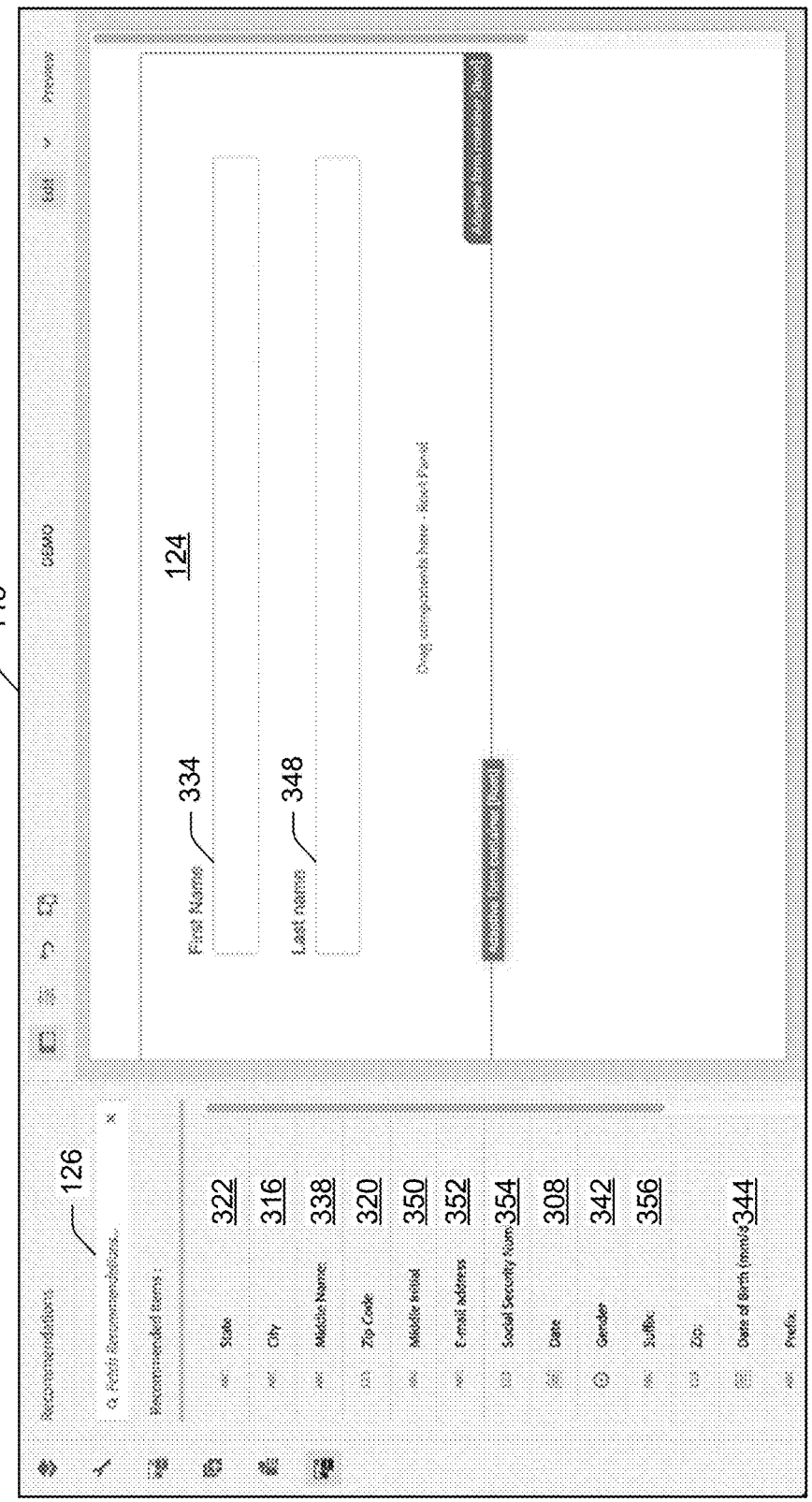
Figure 3D:
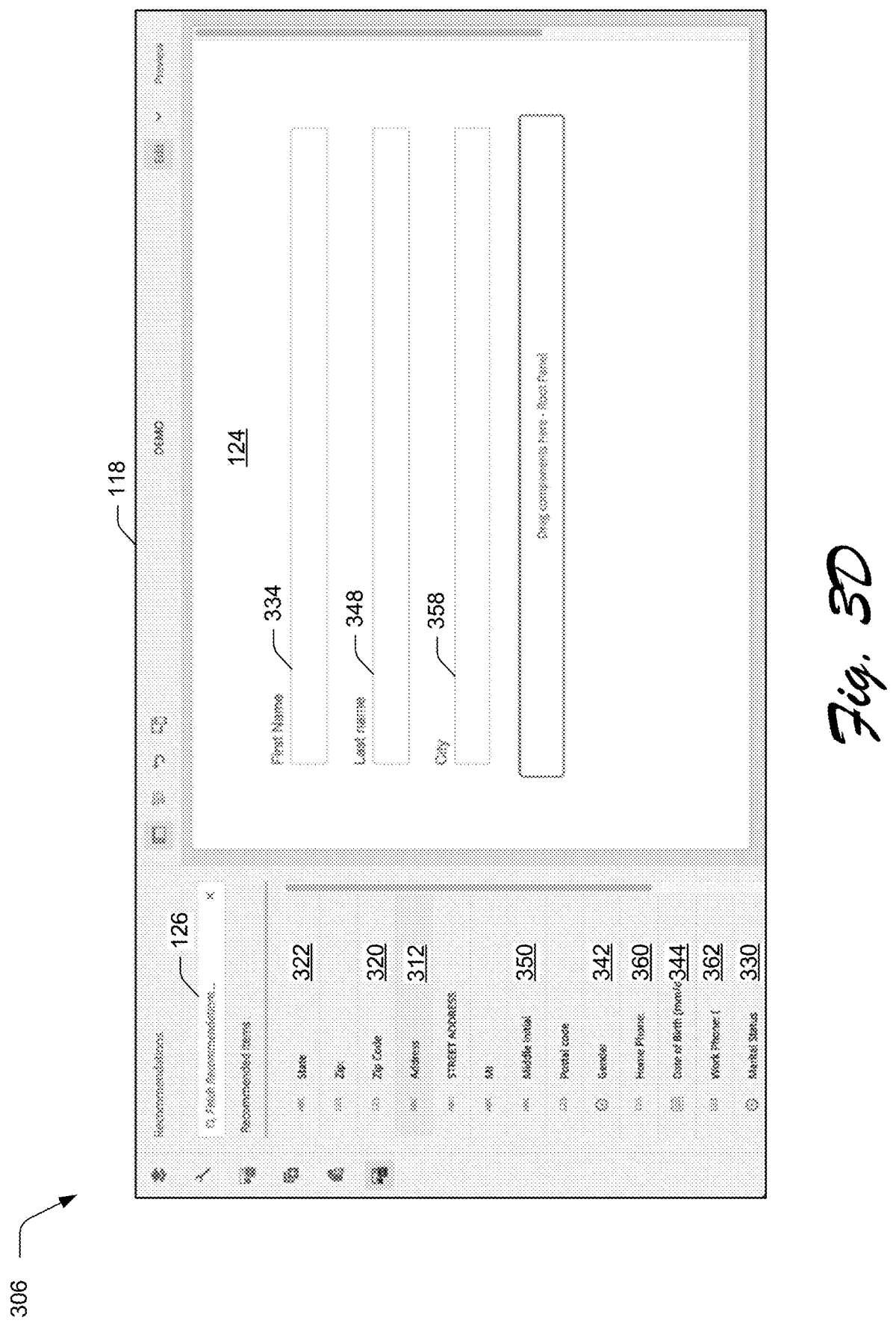

FIGS. 3A, 3B, 3C, and 3D illustrate examples of generating indications of form elements based on form elements included in a digital form. FIG. 3A illustrates a representation 300 of a blank digital form being authored in the authoring interface 118. FIG. 3B illustrates a representation 302 of a first form element added to the digital form. FIG. 3C illustrates a representation 304 of a second form element added to the digital form. FIG. 3D illustrates a representation 306 of a third form element added to the digital form.

With reference to FIG. 3A, the filtering module 202 receives the input data 112 as describing the blank digital form being authored in the authoring interface 118. The filtering module 202 also receives the form data 128 describing databases of thousands of different digital forms which are tagged or labeled with intent information (e.g., page intent, section intent, etc.) and/or natural language descriptions of fields/fragments included in the forms. In the representation 300, the user has not yet interacted with an input device (e.g., a stylus, a mouse, a keyboard, a microphone, a touchscreen, etc.) relative to the authoring interface 118 to add any form elements to the digital form being authored in the authoring interface 118.

The filtering module 202 processes the input data 112 and the form data 128 to identify statistically common form elements that are included in the digital forms described by the form data 128 such as a top N form elements. In some examples, the filtering module 202 identifies the form elements based on fields/fragments that have previously been included in digital forms authored by the user or a similar user. In an example in which the input data 112 describes a title of the digital form being authored in the authoring interface 118, the filtering module 202 is capable of processing the form data 128 to identify the form elements as being included in digital forms having semantically similar titles to the title.

For example, the filtering module 202 identifies a first set of form elements and generates element data 208 as describing the first set of form elements. The display module 206 receives and processes the element data 208 to generate and display user interface components 308-332 in the authoring interface 118. The user interface components 308-332 each correspond to an identified form element included in the first set of form elements described by the element data 208. As shown, each of the user interface components 308-332 is usable to add a field/fragment to the digital form being authored in the authoring interface 118. For instance, user interface component 308 adds a "Date" field, user interface component 310 adds a "Sex" field, user interface component 312 adds an "Address" field; user interface component 314 adds a "Name" field, user interface component 316 adds a "City" field, user interface component 318 adds a "Phone" field, user interface component 320 adds a "Zip Code" field, user interface component 322 adds a "State" field, user interface component 324 adds an "Occupation" field, user interface component 326 adds a "First Name" field, user interface component 328 adds a "Surname" field, user interface component 330 adds a "Marital Status" field, and user interface component 332 adds an "Age" field to the digital form being authored in the authoring interface 118.

In an example, the user interacts with the input device relative to the authoring interface 118 to move the user interface component 326 into the editing panel 124. As shown in FIG. 3B, adding the user interface component 326 to the editing panel 124 adds a first name field 334 to the digital form. The filtering module 202 receives the input data 112 as describing the first name field 334 included in the digital form being authored in the authoring interface 118. For example, the filtering module 202 includes the collaborative filtering model, and the filtering module 202 implements the collaborative filtering model to process the input data 112 and the form data 128 to identify a second set of form elements.

In an example, this is representable as:

$$A = \begin{bmatrix} 1 & \cdots & 1 \\ \vdots & \ddots & \vdots \\ 1 & \cdots & a_{ij} \end{bmatrix}$$

where: A is a sparse matrix and $a_{ij}$ is 1 if an $i^{th}$ digital form described by the form data 128 has form element j.

$$\tilde{u} = [1 \ \cdots \ ]$$

where: $\tilde{u}$ is a digital form vector that indicates which form elements are present in the digital form being authored in the authoring interface 118.

$$d = \left[ \ \cdots \ e^{(n_i - k)r} \ \cdots \ \right] k \in (0, n_i]$$

where: d is a drop-off factor that emphasizes recently authored form elements in the digital form being authored in the authoring interface 118; $n_i$ represents a number of form elements included in the digital form; and k is used to keep track of how recently a corresponding form element was authored.

Form Similarity: $A\tilde{u}^T \cdot d$ $R = \alpha R_{10} + (1-\alpha) R_{all}$ where: $R_{10}$ is a weighted element score of a top 10 similar digital forms; $R_{all}$ is a weighted element score for all similar forms; $\alpha$ is a hyperparameter; and R is a score for a form element that indicates a likelihood that the form element is present in digital forms similar to the digital form being authored in the authoring interface 118 without consideration of nearness or closeness of form elements in the digital forms.

$R_{\tilde{u}} = [ \ \cdots \ p_k \ \cdots \ ]$ where: $R_{\bar{u}}$ is an element probability score and $p_k$ captures a probability of expecting element k in an immediate neighborhood given ū.

$$R_{overall} = \beta R_{\bar{u}} + (1-\beta)R$$

$$\text{predictions} = k \text{ argmax } R_{overall}$$

where: $R_{overall}$ is an overall element score and β is a hyperparameter.

The filtering module 202 identifies the second set of form elements using the collaborative filtering model trained on the form data 128 as training data, and the filtering module 202 generates the element data 208 as describing the second set of form elements. For example, the training data describes form elements included together in digital forms of a collection of digital forms described by the form data 128. The display module 206 receives and processes the element data 208 to generate and display user interface component 336, user interface component 338, the user interface component 322, the user interface component 316, user interface component 340, the user interface component 320, the user interface component 312, user interface component 342, user interface component 344, the user interface component 328, user interface component 346, and the user interface component 308 in the authoring interface 118. For example, the user interface component 336 adds a "Last Name" field, the user interface component 338 adds a "Middle Name" field, the user interface component 340 adds a "Country" field, the user interface component 342 adds a "Gender" field, the user interface component 344 adds a "Date of Birth" field, and the user interface component 346 adds a "Pin Code" field to the digital form being authored in the authoring interface 118.

The user further interacts with the input device relative to the authoring interface 118 to move the user interface component 336 into the editing panel 124. As illustrated in FIG. 3C, adding the user interface component 336 to the editing panel 124 adds a last name field 348 to the digital form. For instance, the filtering module 202 receives the input data 112 as describing the last name field 348 and also the first name field 334. The filtering module 202 implements the trained collaborative filtering model to identify a third set of form elements by processing the input data 112 and the form data 128. For example, the filtering module 202 generates the element data 208 as describing the third set of form elements. In this example, the display module 206 receives and processes the element data 208 to generate and display the user interface component 322, the user interface component 316, the user interface component 338, the user interface component 320, user interface component 350, user interface component 352, user interface component 354, the user interface component 308, the user interface component 342, user interface component 356, and the user interface component 344 in the authoring interface 118. The user interface component 350 adds a "Middle Name" field, the user interface component 352 adds an "E-mail Address" field, the user interface component 354 adds a "Social Security Number" field, and the user interface component 356 adds a "Suffix" field to the digital form being authored in the authoring interface 118.

For instance, the user interacts with the input device relative to the authoring interface 118 to move the user interface component 316 into the editing panel 124 of the authoring interface 118. This interaction adds a city field 358 to the digital form which is shown in the representation 306 of FIG. 3D. In an example, the filtering module 202 receives the input data 112 as describing the city field 358 as the most recently added form element to the digital form being authored in the authoring interface 118. In this example, the input data 112 also describes the first name field 334 and the last name field 348.

The filtering module 202 flattens the digital form into a sequence of the first name field 334, the last name field 348, and the city field 358 and processes the sequence along with the form data 128 using the trained collaborative filtering model to identify a fourth set of form elements. For example, the filtering module 202 generates the element data 208 as describing the fourth set of form elements, and the display module 206 receives and processes the element data 208 to generate and display the user interface component 322, the user interface component 320, the user interface component 312, the user interface component 350, the user interface component 342, user interface component 360, the user interface component 344, user interface component 362, and the user interface component 330 in the authoring interface. As illustrated in FIG. 3D, the user interface component 360 is usable to add a "Home Phone" field to the digital form and the user interface component 362 is usable to add a "Work Phone" field to the digital form.

Figure 4:
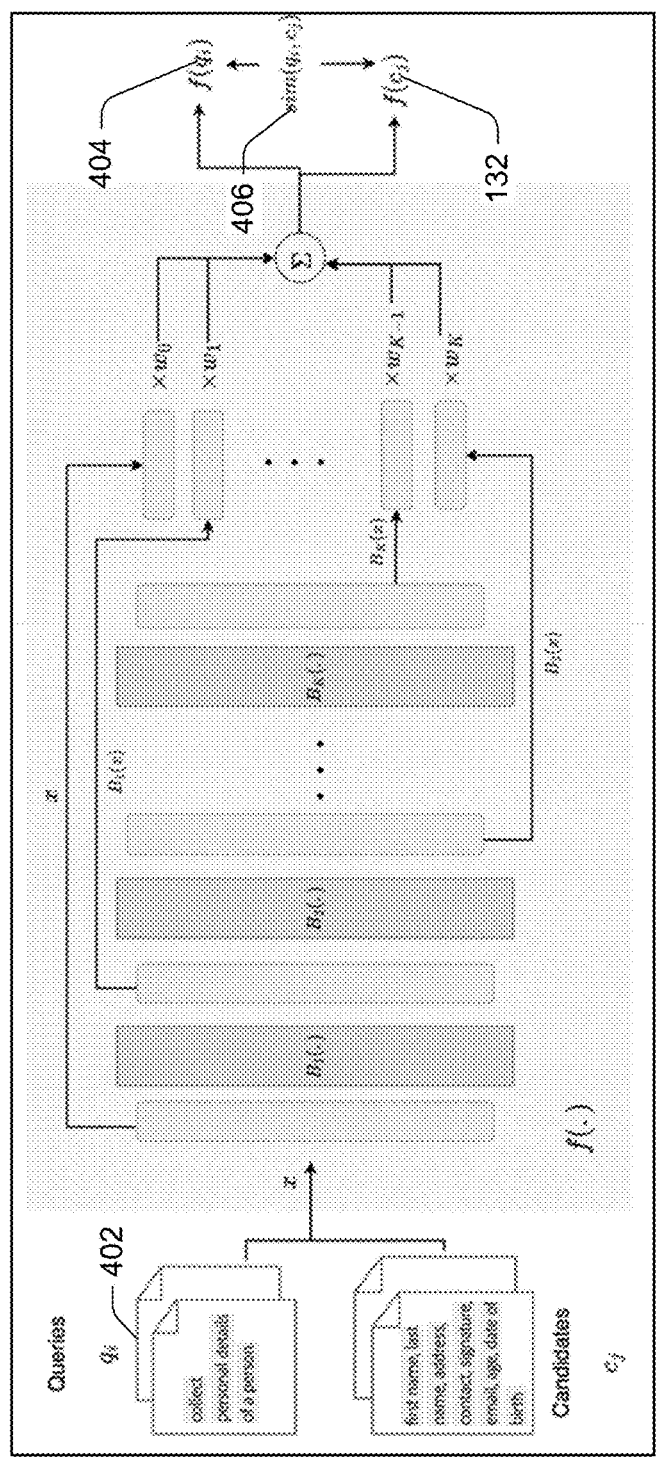
FIG. 4 illustrates a representation of a machine learning model.

For example, the user interacts with the input device relative to the authoring interface 118 to add an additional form element to the digital form and/or to enter a search query in the search field 126. In the example in which the user enters the search query in the search field 126, the embedding module 204 receives the input data 112 as describing a search input based on the search query. FIG. 4 illustrates a representation 400 of a machine learning model. The embedding module 204 includes the machine learning model in an example. As shown in the example illustrated in FIG. 4, the machine learning model includes a Bidirectional Encoder Representations from Transformers model.

In an example, the machine learning model's architecture is representable as:

$$f(x) = w_o x + w_1 B_1(x) \ldots + w_K B_K(x)$$

where: $B_i(x)$ represents an output of the $i^{th}$ transformer layer (with K total layers) and $w_i$ represents learnable weights of the $i^{th}$ transformer layer.

The embedding module 204 trains the machine learning model on training data describing pairs of search inputs and corresponding candidate search outputs extracted from the form data 128. In one example, the embedding module 204 defines a similarity between embedding vectors generated for pairs of the search inputs and candidate search outputs using the machine learning model as a cosine similarity which is representable as:

$$\text{sim}(q_i, c_j) = \frac{\langle f(q_i), f(c_j) \rangle}{\|f(q_i)\| \cdot \|f(c_j)\|}$$

where: $q_i$ represents a search input and $c_j$ represents a candidate search output.

Although similarity between embedding vectors generated for pairs of the search inputs and candidate search outputs using the machine learning model is described as a cosine similarity, it is to be appreciated that other definitions of similarity are usable in other examples. For example, the embedding module 204 is capable of defining similarity between embedding vectors in the latent space based on Manhattan distances, Hamming distances, Euclidian distances, Minkowski distances, and so forth.

In order to maximize similarity between matching pairs of search inputs and outputs $(q_i, c_i)$ and to minimize similarity between non-matching pairs of search inputs and outputs ($q_i$, $c_{j \neq i}$), the embedding module 204 trains the machine learning model on the training data by maximizing a negative log likelihood which is representable as:

$$L = -\log\left(\frac{e^{sim(q_i, c_i)}}{\sum_{j \neq i} e^{sim(q_i, c_j)}}\right)$$

As described above, the authoring module 110 precomputes a candidate embedding vector for each of the candidate search outputs extracted from the form data 128 using the trained machine learning model and generates the embeddings data 132 describing the candidate embedding vectors. As shown in FIG. 4, the embedding module 204 receives the input data 112 describing a search input q 402, and the embedding module 204 processes the search input q 402 using the trained machine learning model to generate an input embedding vector f(q) 404 which represents the search input q 402 in a latent space. For example, the embedding module 204 identifies a set of candidate search outputs c by computing similarities sim(q, c) 406 between the input embedding vector f(q) 404 and the candidate embedding vectors described by the embeddings data 132. In this example, the set of candidate search outputs c is based on a number of the candidate embedding vectors described by the embeddings data 132 having a highest similarity sim(q, c) 406. For instance, the number is a top 5, a top 10, a top 15, and so forth.

Figure 5A:
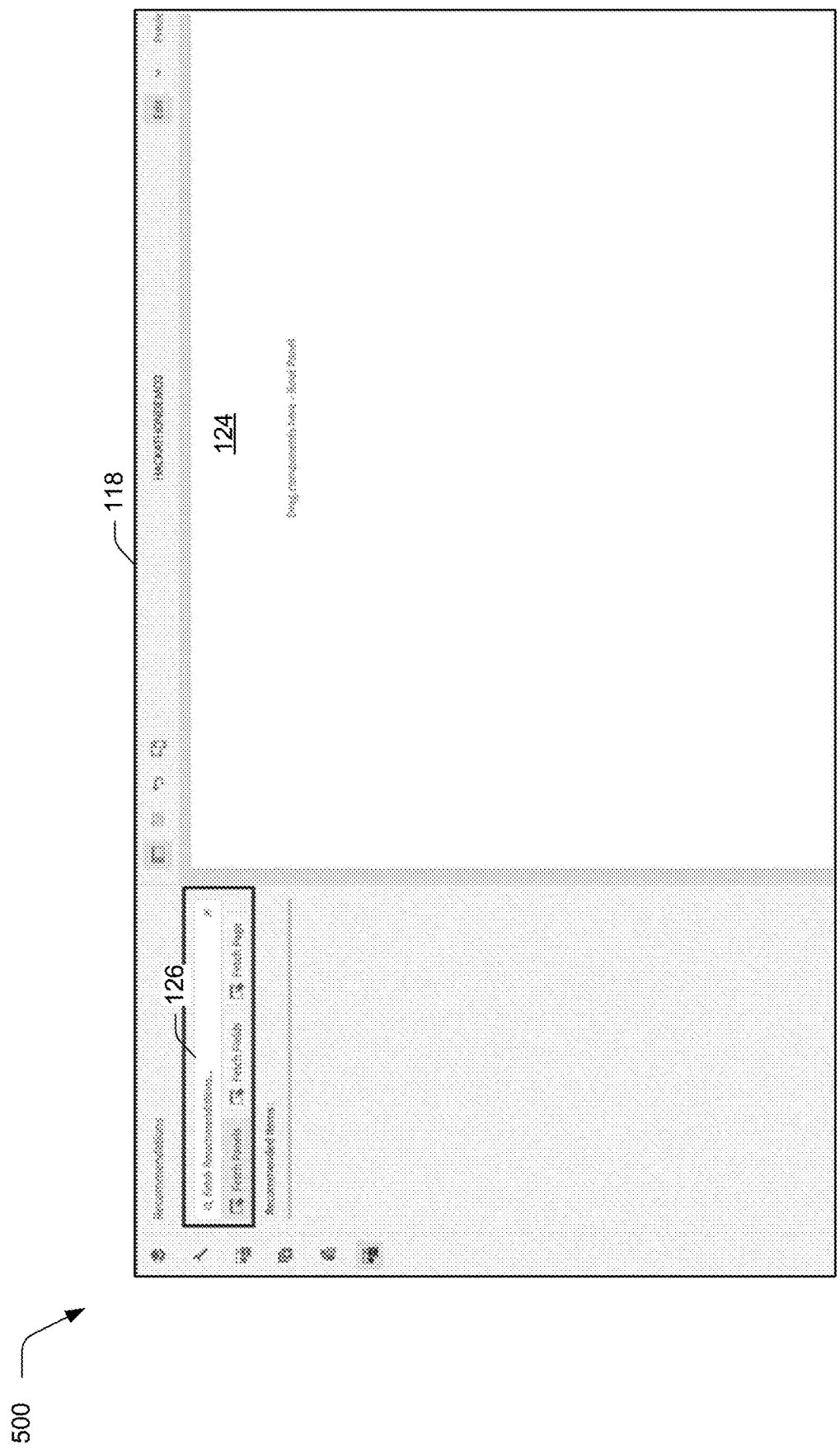
Figure 5B:
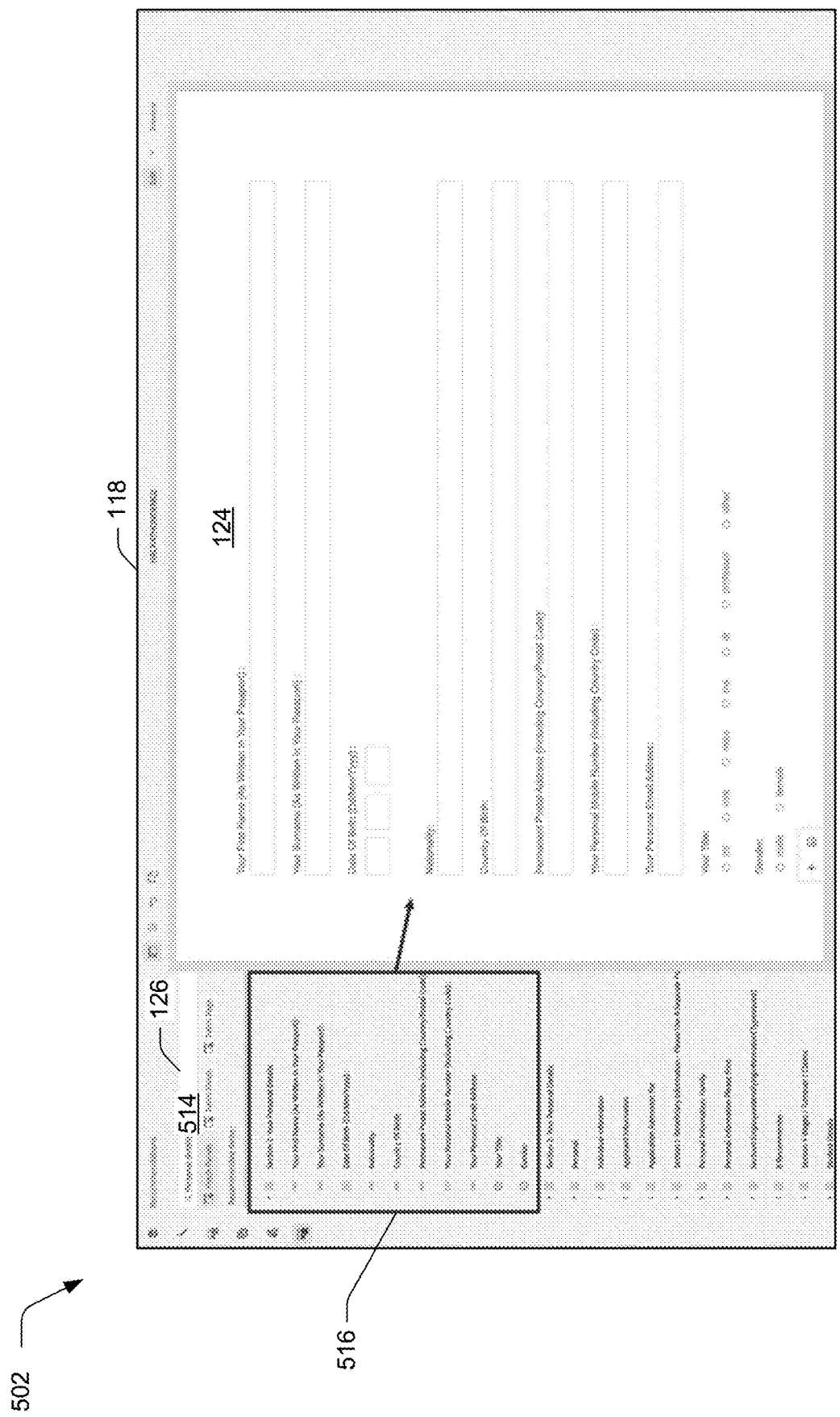
Figure 5C:
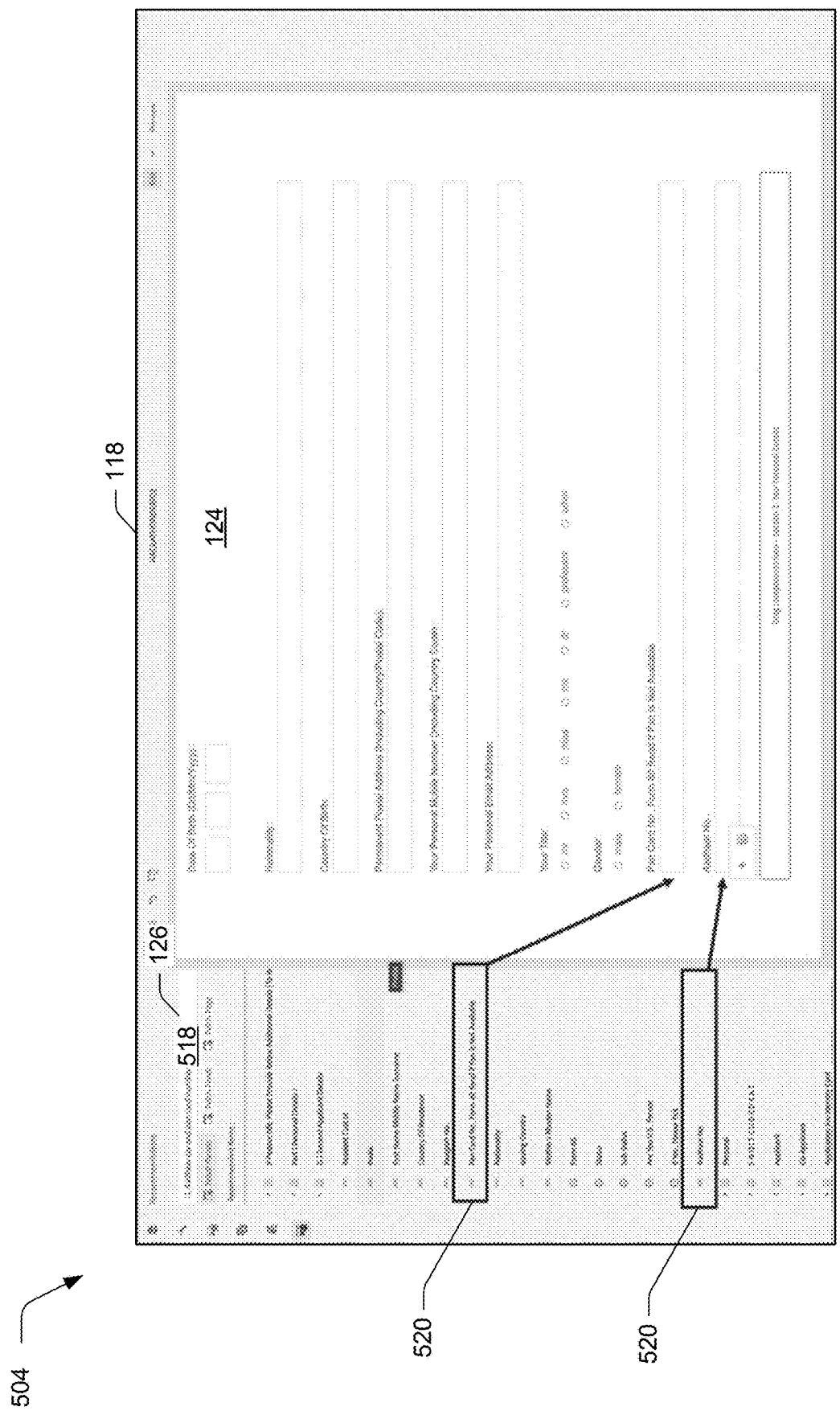
Figure 5D:
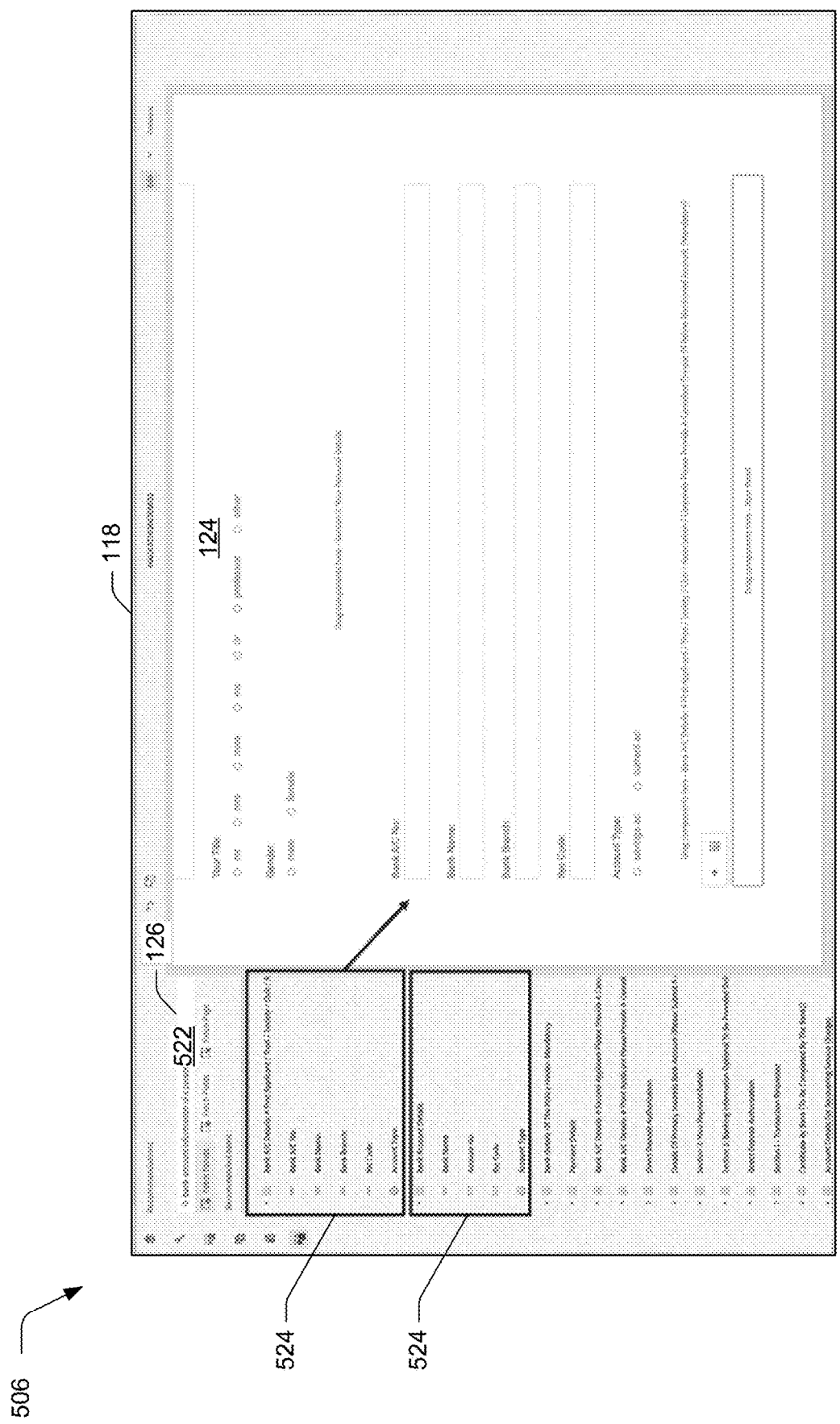
Figure 5E:
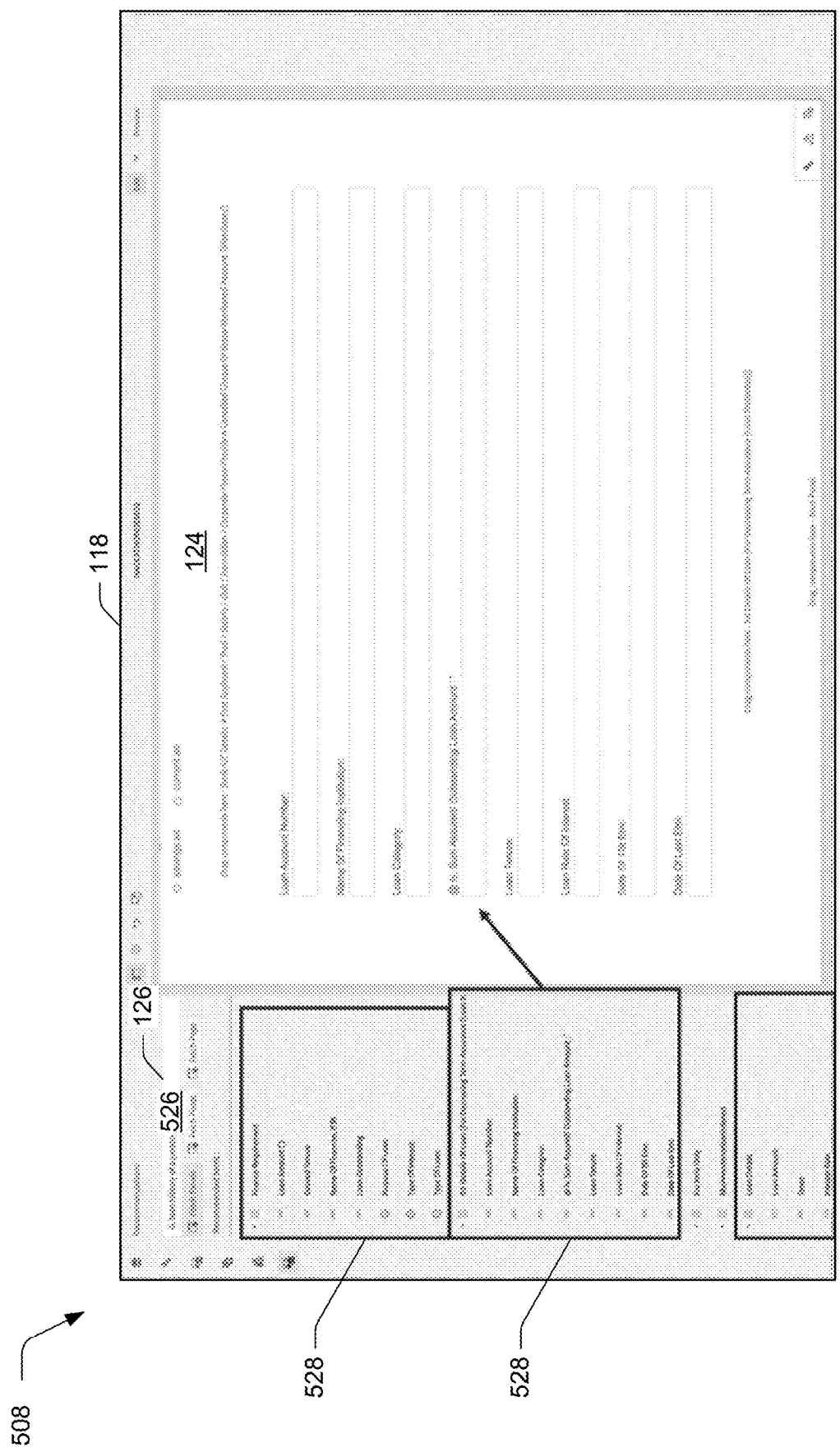
Figure 57:
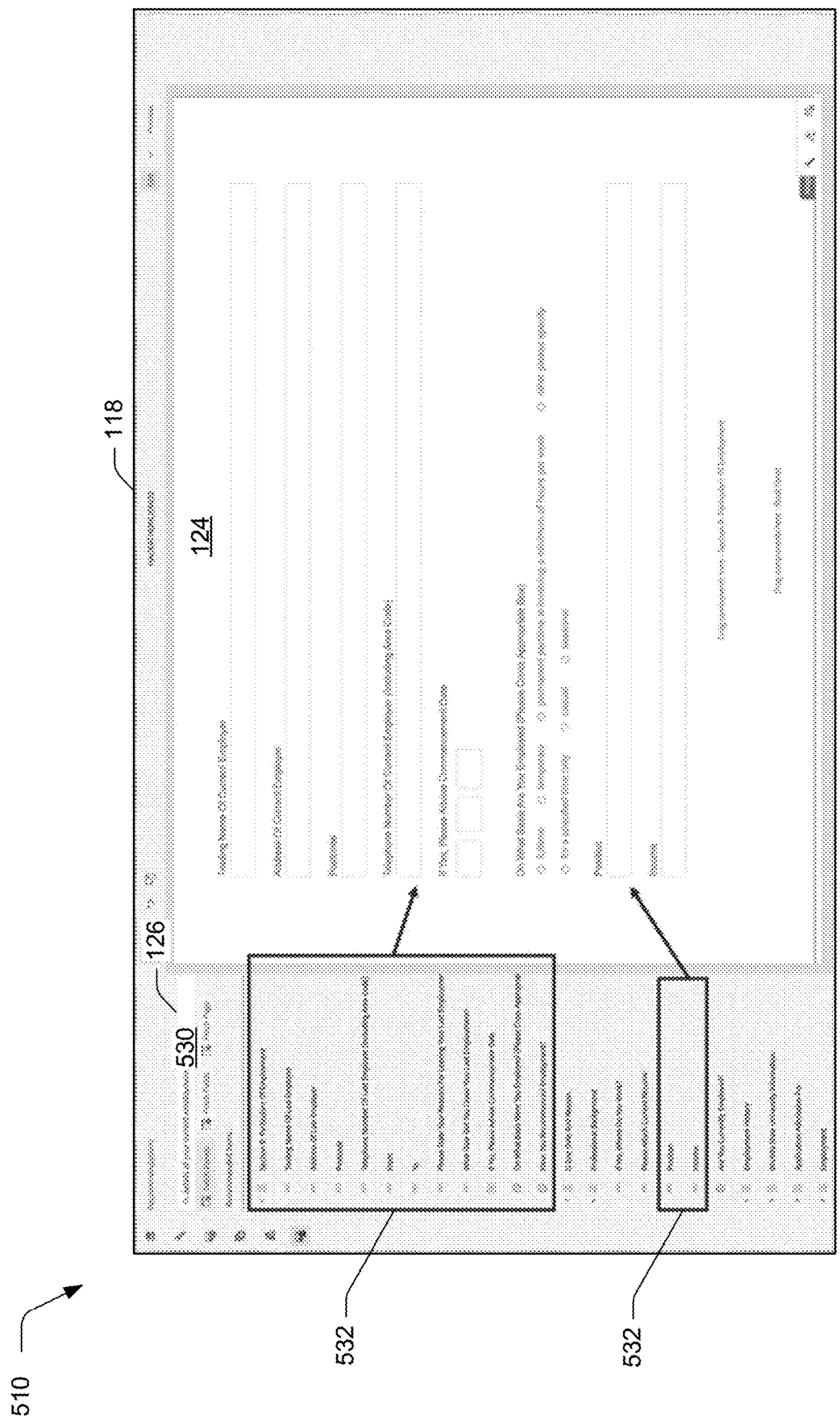
Figure 5G:
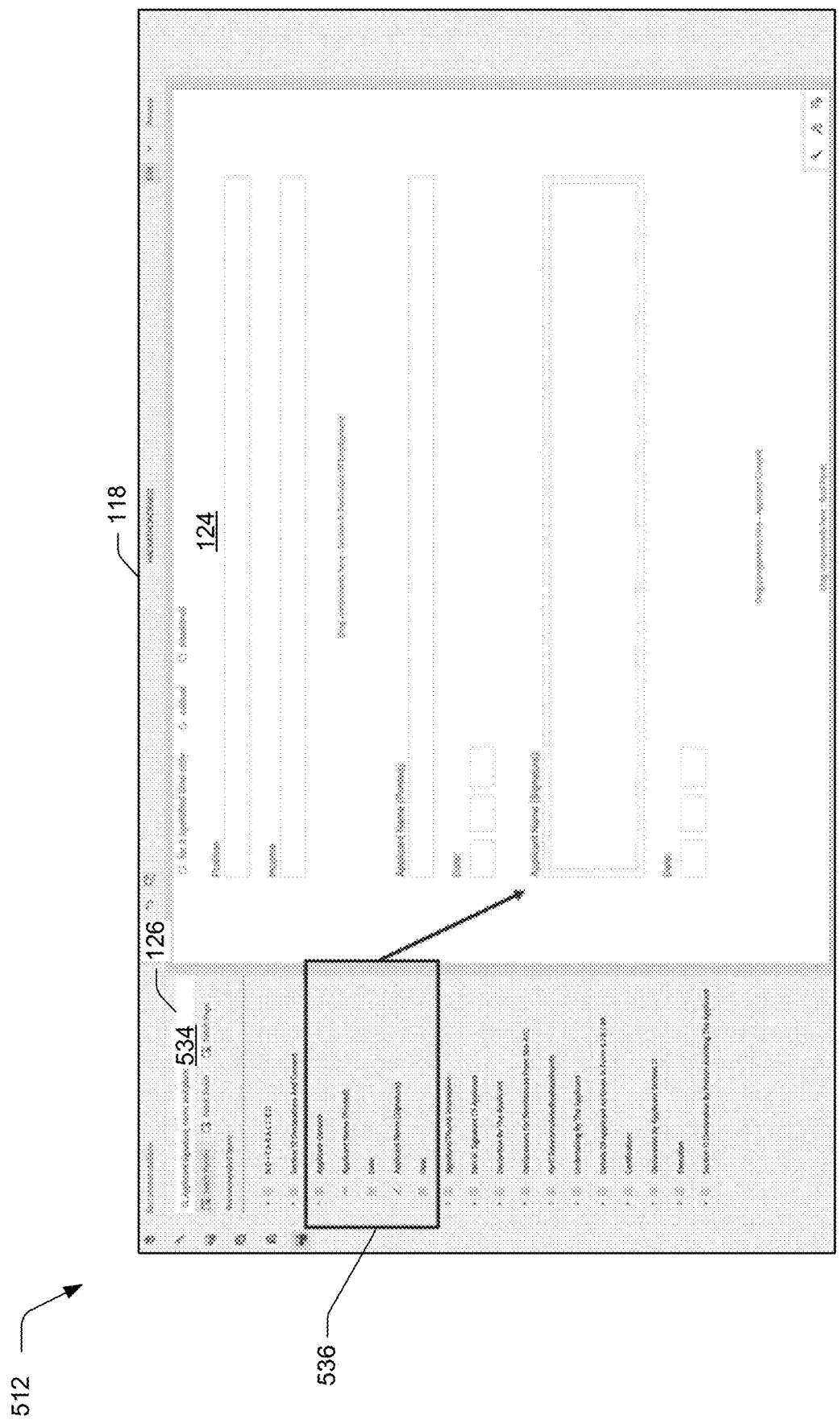

FIGS. 5A, 5B, 5C, 5D, 5E, 5F, and 5G illustrate examples of generating indications of search outputs based on search inputs associated with a digital form. FIG. 5A illustrates a representation 500 of a blank digital form being authored in the authoring interface 118. FIG. 5B illustrates a representation 502 of a first search input associated with the digital form being authored in the authoring interface 118. FIG. 5C illustrates a representation 504 of a second search input associated with the digital form being authored in the authoring interface 118. FIG. 5D illustrates a representation 506 of a third search input associated with the digital form being authored in the authoring interface 118. FIG. 5E illustrates a representation 508 of a fourth search input associated with the digital form being authored in the authoring interface 118. FIG. 5F illustrates a representation 510 of a fifth search input associated with the digital form being authored in the authoring interface 118. FIG. 5G illustrates a representation 512 of a sixth search input associated with the digital form being authored in the authoring interface 118.

With reference to FIGS. 5A and 5B, the user interacts with the input device relative to the authoring interface 118 to begin authoring the blank digital form as shown in the representation 500 by specifying a first search input 514 in the search field 126 of the authoring interface 118. The first search input 514 is a natural language query of "Personal details." For example, the embedding module 204 receives the input data 112 as describing the first search input 514. The embedding module 204 generates an embedding vector that represents the first search input 514 in the latent space. For instance, the embedding module 204 receives and processes the embeddings data 132 which describes the candidate embedding vectors that represent the candidate search outputs extracted from the form data 128 in the latent space.

The embedding module 204 computes similarities, e.g., cosine similarities, between the embedding vector that represents the first search input 514 and the candidate embedding vectors that represent the candidate search outputs. For example, the embedding module 204 identifies a first set of candidate search outputs based on the computed similarities. In this example, candidate search outputs included in the first set are represented by candidate embedding vectors having a highest similarity with the embedding vector that represents the first search input 514.

The embedding module 204 generates candidate data 210 as describing the first set of candidate search outputs. The display module 206 receives and processes the candidate data 210 to generate and display an indication 516 of the first set of candidate search outputs. As shown, the user manipulates the input device to interact with the indication 516 which adds the first set of candidate search outputs to the digital form being authored in the authoring interface 118.

In the representation 504 of FIG. 5C, the user interacts with the input device relative to the authoring interface 118 to specify a second search input 518 in the search field 126. The second search input 518 is a natural language query of "Aadhaar car and pan card number." In one example, the embedding module 204 receives the input data 112 as describing the second search input 518 and generates the candidate data 210 as describing a second set of candidate search outputs. The display module 206 receives and processes the candidate data 210 to generate and display an indication 520 of the second set of candidate search outputs. For instance, the user interacts with the input device relative to the indication 520 and adds the second set of candidate search outputs to the digital form being authored in the authoring interface 118.

With reference to FIG. 5D, the user interacts with the input device relative to the authoring interface 118 to specify a third search input 522 in the search field 126. For example, the third search input 522 is a natural language query of "bank account information of a person." In this example, the embedding module 204 receives the input data 112 as describing the third search input 522. The embedding module 204 processes the input data 112 using the trained machine learning model to generate the candidate data 210 as describing a third set of candidate search outputs. The display module 206 receives and processes the candidate data 210 to generate and display an indication 524 of the third set of candidate search outputs. The user interacts with the input device relative to the indication 524 which adds the third set of candidate search outputs to the digital form being authored in the authoring interface 118.

As illustrated in FIG. 5E, the user interacts with the input device relative to the authoring interface 118 to specify a fourth search input 526 in the search field 126. The fourth search input 526 is a natural language query of "loan history of a person." In an example, the embedding module 204 receives the input data 112 as describing the fourth search input 526 and generates the candidate data 210 as describing a fourth set of candidate search outputs. The display module 206 receives and processes the candidate data 210 to generate and display an indication 528 of the fourth set of candidate search outputs. For example, the user interacts with the input device relative to the indication 528 and adds the fourth set of candidate search outputs to the digital form being authored in the authoring interface 118.

As shown in FIG. 5F, the user interacts with the input device relative to the authoring interface 118 to specify a fifth search input 530 in the search field 126. In one example, the fifth search input 530 is a natural language query of "details of your current employment." In this example, the embedding module 204 receives the input data 112 as describing the fifth search input 530. The embedding module 204 processes the input data 112 using the trained machine learning model to generate the candidate data 210 as describing a fifth set of candidate search outputs. For instance, the display module 206 receives and processes the candidate data 210 to generate and display an indication 532 of the fifth set of candidate search outputs. The user interacts with the input device relative to the indication 532 which adds the fifth set of candidate search outputs to the digital form being authored in the authoring interface 118.

With reference to FIG. 5G, the user interacts with the input device relative to the authoring interface 118 to specify a sixth search input 534 in the search field 126. The sixth search input 534 is a natural language query of "Applicant signature, name and place." In an example, the embedding module 204 receives the input data 112 as describing the sixth search input 534 and generates the candidate data 210 as describing a sixth set of candidate search outputs. The display module 206 receives and processes the candidate data 210 to generate and display an indication 536 of the sixth set of candidate search outputs. For example, the user interacts with the input device relative to the indication 536 and adds the sixth set of candidate search outputs to the digital form being authored in the authoring interface 118.

Figure 6:
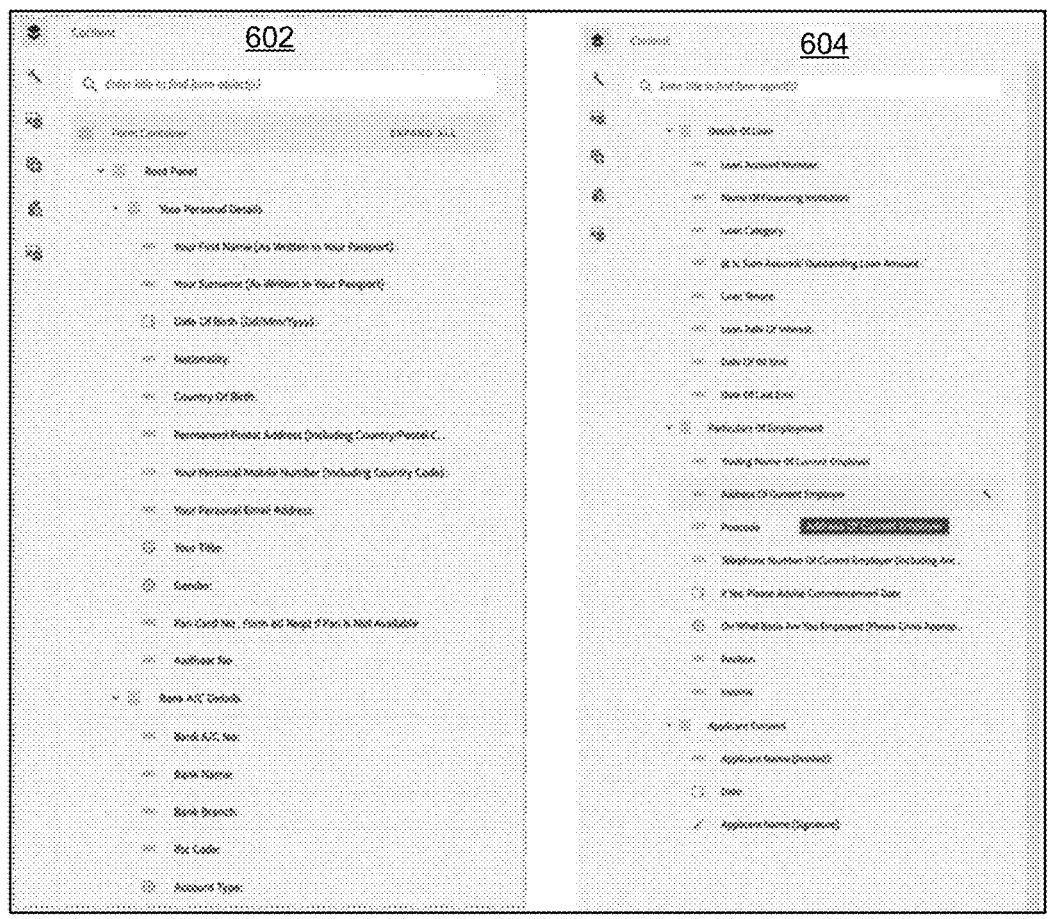
FIG. 6 illustrates a representation of a digital form created using the described systems for assistive digital form authoring.

FIG. 6 illustrates a representation 600 of a digital form created using the described systems for digital form authoring. As shown, the digital form includes a first portion 602 and a second portion 604. The authoring module 110 receives the input data 112 describing form elements included in the digital form or search inputs specified relative to the digital form and the user interacts with indications of additional form elements or candidate search outputs to author the digital form included in the representation 600.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable individually, together, and/or combined in different ways. Thus, individual functionality, features, and concepts described in relation to different example environments, devices, components, figures, and procedures herein are usable in any suitable combinations and are not limited to the particular combinations represented by the enumerated examples in this description.

Example Procedures

Figure 7:
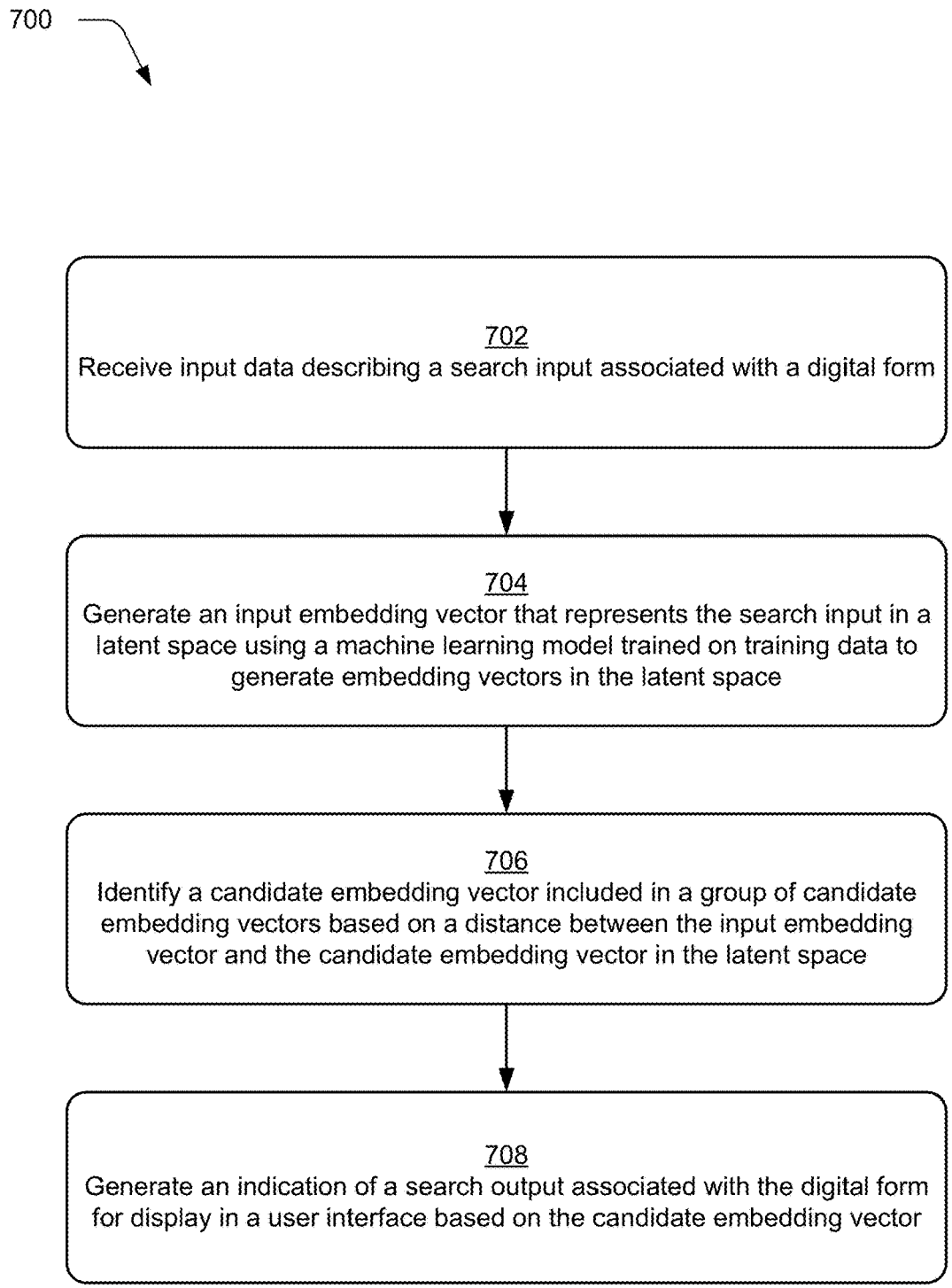
FIG. 7 is a flow diagram depicting a procedure in an example implementation in which an indication of a search output associated with a digital form is generated based on input data describing a search input associated with the digital form.

The following discussion describes techniques which are implementable utilizing the previously described systems and devices. Aspects of each of the procedures are implementable in hardware, firmware, software, or a combination thereof. The procedures are shown as a set of blocks that specify operations performed by one or more devices and are not necessarily limited to the orders shown for performing the operations by the respective blocks. In portions of the following discussion, reference is made to FIGS. 1-6. FIG. 7 is a flow diagram depicting a procedure 700 in an example implementation in which an indication of a search output associated with a digital form is generated based on input data describing a search input associated with the digital form.

Input data is received describing a search input associated with a digital form (block 702). For example, the computing device 102 implements the authoring module 110 to receive the input data. An input embedding vector is generated that represents the search input in a latent space using a machine learning model trained on training data to generate embedding vectors in the latent space (block 704). In one example, the authoring module 110 generates the input embedding vector using the machine learning model.

A candidate embedding vector included in a group of candidate embedding vectors is identified based on a distance between the input embedding vector and the candidate embedding vector in the latent space (block 706). In an example, the computing device 102 implements the authoring module 110 to identify the candidate embedding vector. An indication of a search output associated with the digital form is generated for display in a user interface based on the candidate embedding vector (block 708). In some examples, the authoring module 110 generates the indication of the search output associated with the digital form.

Figure 8:
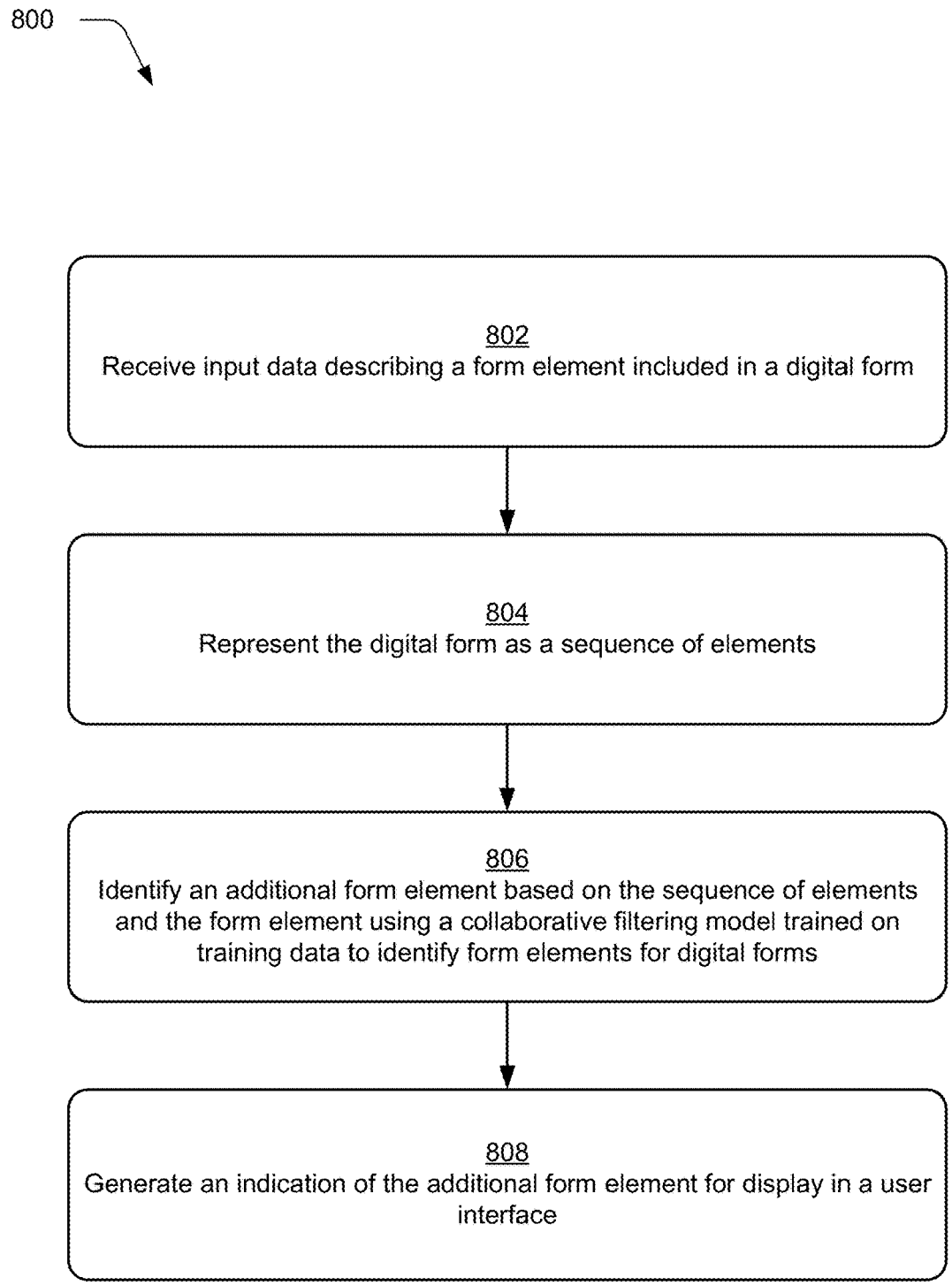
FIG. 8 is a flow diagram depicting a procedure in an example implementation in which an indication of an additional form element is generated based on input data describing a form element included in a digital form.

FIG. 8 is a flow diagram depicting a procedure 800 in an example implementation in which an indication of an additional form element is generated based on input data describing a form element included in a digital form. Input data is received describing a form element included in a digital form (block 802). For example, the computing device 102 implements the authoring module 110 to receive the input data. The digital form is represented as a sequence of elements (block 804). In one example, the authoring module 110 represents the digital form as the sequence of elements.

An additional form element is identified based on the sequence of elements and the form element using a collaborative filtering model trained on training data to identify from elements for digital forms (block 806). In an example, the computing device 102 implements the authoring module 110 to identify the additional form element using the collaborative filtering model. An indication of the additional form element is generated for display in a user interface (block 808). In some examples, the authoring module 110 generates the indication of the additional form element for display in the user interface.

Figure 9:
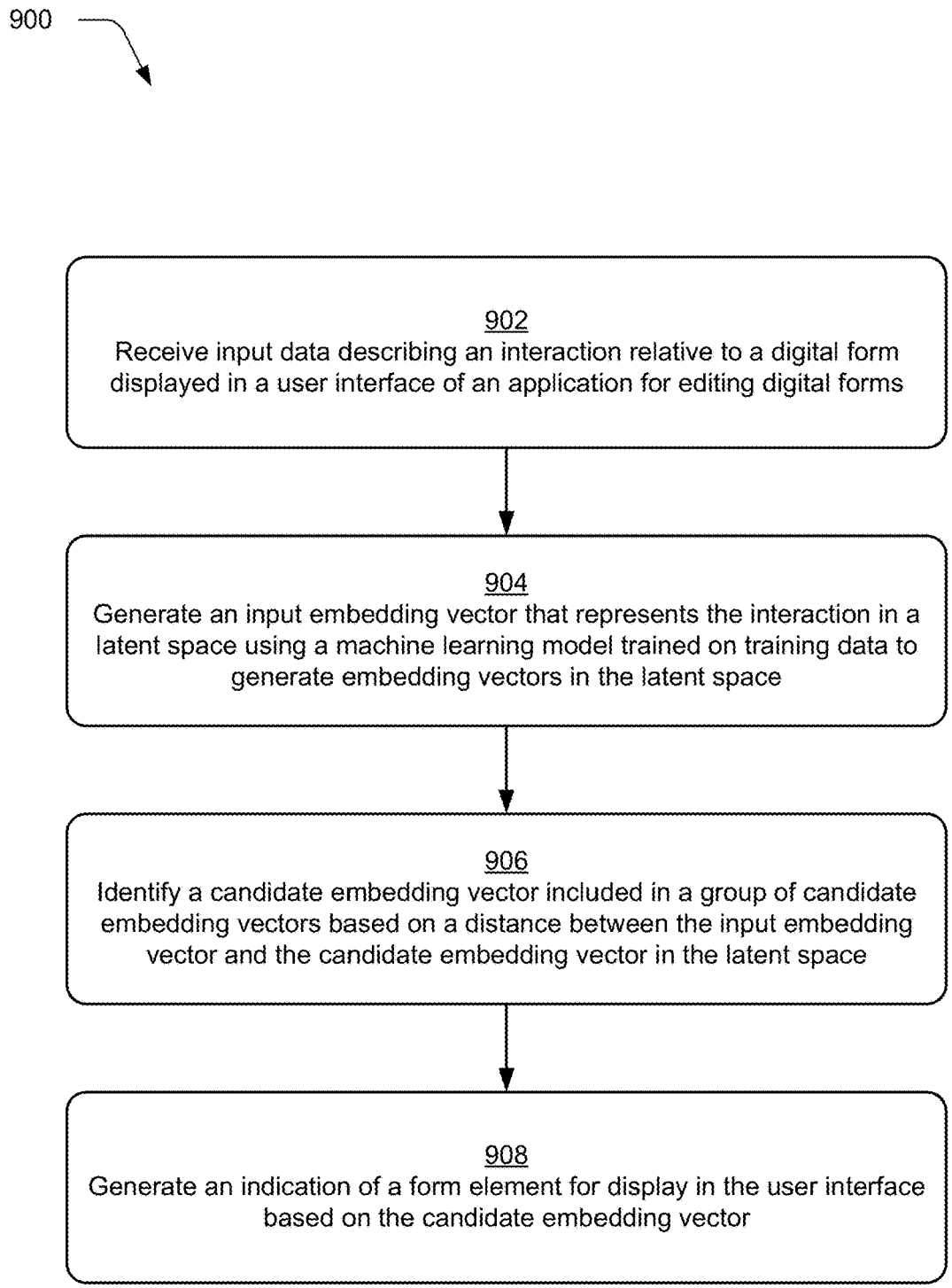
FIG. 9 is a flow diagram depicting a procedure in an example implementation in which an indication of a form element is generated based on input data describing an interaction relative to a digital form.

FIG. 9 is a flow diagram depicting a procedure 900 in an example implementation in which an indication of a form element is generated based on input data describing an interaction relative to a digital form. Input data is received describing an interaction relative to a digital form displayed in a user interface of an application for editing digital forms (block 902). For example, the authoring module 110 receives the input data. An input embedding vector that represents the interaction in a latent space is generated using a machine learning model training on training data to generate embedding vectors in the latent space (block 904). In an example, the computing device 102 implements the authoring module 110 to generate the input embedding vector using the machine learning model.

A candidate embedding vector included in a group of candidate embedding vectors is identified based on a distance between the input embedding vector and the candidate embedding vector in the latent space (block 906). In some examples, the authoring module 110 identifies the candidate embedding vector. An indication of a form element is generated for display in a user interface based on the candidate embedding vector (block 908). For example, the computing device 102 implements the authoring module 110 to generate the indication of the form element for display in the user interface.

Example System and Device

Figure 10:
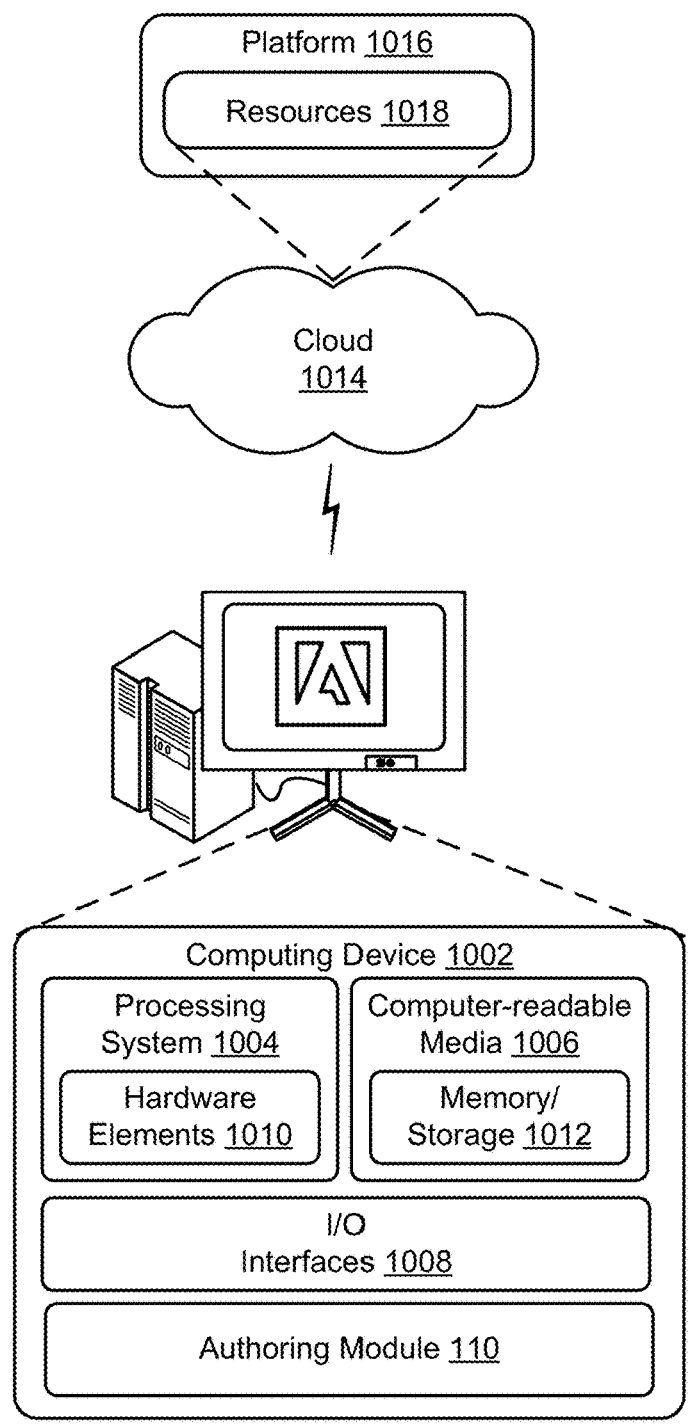
FIG. 10 illustrates an example system that includes an example computing device that is representative of one or more computing systems and/or devices for implementing the various techniques described herein.

FIG. 10 illustrates an example system 1000 that includes an example computing device that is representative of one or more computing systems and/or devices that are usable to implement the various techniques described herein. This is illustrated through inclusion of the authoring module 110. The computing device 1002 includes, for example, a server of a service provider, a device associated with a client (e.g., a client device), an on-chip system, and/or any other suitable computing device or computing system.

The example computing device 1002 as illustrated includes a processing system 1004, one or more computer-readable media 1006, and one or more I/O interfaces 1008 that are communicatively coupled, one to another. Although not shown, the computing device 1002 further includes a system bus or other data and command transfer system that couples the various components, one to another. For example, a system bus includes any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1004 is representative of functionality to perform one or more operations using hardware. Accordingly, the processing system 1004 is illustrated as including hardware elements 1010 that are configured as processors, functional blocks, and so forth. This includes example implementations in hardware as an application specific integrated circuit or other logic device formed using one or more semiconductors. The hardware elements 1010 are not limited by the materials from which they are formed or the processing mechanisms employed therein. For example, processors are comprised of semiconductor(s) and/or transistors (e.g., electronic integrated circuits (ICs)). In such a context, processor-executable instructions are, for example, electronically-executable instructions.

The computer-readable media 1006 is illustrated as including memory/storage 1012. The memory/storage 1012 represents memory/storage capacity associated with one or more computer-readable media. In one example, the memory/storage 1012 includes volatile media (such as random access memory (RAM)) and/or nonvolatile media (such as read only memory (ROM), Flash memory, optical disks, magnetic disks, and so forth). In another example, the memory/storage 1012 includes fixed media (e.g., RAM, ROM, a fixed hard drive, and so on) as well as removable media (e.g., Flash memory, a removable hard drive, an optical disc, and so forth). The computer-readable media 1006 is configurable in a variety of other ways as further described below.

Input/output interface(s) 1008 are representative of functionality to allow a user to enter commands and information to computing device 1002, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which employs visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1002 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are implementable on a variety of commercial computing platforms having a variety of processors.

Implementations of the described modules and techniques are storable on or transmitted across some form of computer-readable media. For example, the computer-readable media includes a variety of media that is accessible to the computing device 1002. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which are accessible to a computer.

"Computer-readable signal media" refers to a signal-bearing medium that is configured to transmit instructions to the hardware of the computing device 1002, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1010 and computer-readable media 1006 are representative of modules, programmable device logic and/or fixed device logic implemented in a hardware form that is employable in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also employable to implement various techniques described herein. Accordingly, software, hardware, or executable modules are implementable as one or more instructions and/or logic embodied on some form of computer-readable storage media and/or by one or more hardware elements 1010. For example, the computing device 1002 is configured to implement particular instructions and/or functions corresponding to the software and/or hardware modules. Accordingly, implementation of a module that is executable by the computing device 1002 as software is achieved at least partially in hardware, e.g., through use of computer-readable storage media and/or hardware elements 1010 of the processing system 1004. The instructions and/or functions are executable/operable by one or more articles of manufacture (for example, one or more computing devices 1002 and/or processing systems 1004) to implement techniques, modules, and examples described herein.

The techniques described herein are supportable by various configurations of the computing device 1002 and are not limited to the specific examples of the techniques described herein. This functionality is also implementable entirely or partially through use of a distributed system, such as over a "cloud" 1014 as described below.

The cloud 1014 includes and/or is representative of a platform 1016 for resources 1018. The platform 1016 abstracts underlying functionality of hardware (e.g., servers) and software resources of the cloud 1014. For example, the resources 1018 include applications and/or data that are utilized while computer processing is executed on servers that are remote from the computing device 1002. In some examples, the resources 1018 also include services provided over the Internet and/or through a subscriber network, such as a cellular or Wi-Fi network.

The platform 1016 abstracts the resources 1018 and functions to connect the computing device 1002 with other computing devices. In some examples, the platform 1016 also serves to abstract scaling of resources to provide a corresponding level of scale to encountered demand for the resources that are implemented via the platform. Accordingly, in an interconnected device embodiment, implementation of functionality described herein is distributable throughout the system 1000. For example, the functionality is implementable in part on the computing device 1002 as well as via the platform 1016 that abstracts the functionality of the cloud 1014.

CONCLUSION

Although implementations of systems for assistive digital form authoring have been described in language specific to structural features and/or methods, it is to be understood that the appended claims are not necessarily limited to the specific features or methods described. Rather, the specific features and methods are disclosed as example implementations of systems for assistive digital form authoring, and other equivalent features and methods are intended to be within the scope of the appended claims. Further, various different examples are described and it is to be appreciated that each described example is implementable independently or in connection with one or more other described examples.

What is claimed is:

1. A method comprising:
    receiving, by a processing device, form data describing a plurality of different digital forms;
    identifying, by the processing device, based on the form data, a plurality of candidate search outputs for a plurality of search inputs;
    generating, by the processing device, a group of candidate embedding vectors in a latent space corresponding to the plurality of candidate search outputs, the generating performed using a machine learning model;
    receiving, by the processing device, input data describing a subsequent search input associated with a digital form;
    generating, by the processing device, an input embedding vector that represents the subsequent search input in the latent space using the machine learning model;
    identifying, by the processing device, a candidate embedding vector included in the group of candidate embedding vectors based on a distance between the input embedding vector and the identified candidate embedding vector in the latent space; and
    generating, by the processing device, an indication of a search output associated with the digital form for display in a user interface based on the identified candidate embedding vector.

2. The method as described in claim 1, wherein the search input is a natural language search query.

3. The method as described in claim 1, further comprising generating a further indication of an additional form element for display in the user interface based on a form element included in the digital form.

4. The method as described in claim 3, wherein the additional form element is at least one of a field or a fragment.

5. The method as described in claim 3, wherein the additional form element is identified using a collaborative filtering model trained on additional training data to identify form elements for digital forms.

6. The method as described in claim 5, wherein the additional training data describes form elements included together in digital forms of a collection of digital forms.

7. The method as described in claim 1, wherein the form data is labeled with intent information.

8. The method as described in claim 1, wherein the form data is labeled with natural language descriptions.

9. A system comprising:
    a processing device; and
    a memory component storing instructions, which when executed by the processing device, cause the processing device to perform operations comprising:
        receiving form data describing a plurality of different digital forms;
        identifying, based on the form data, a plurality of candidate search outputs for a plurality of search inputs;
        generating a group of candidate embedding vectors in a latent space corresponding to the plurality of candidate search outputs, the generating performed using a machine learning model;
        receiving input data describing a subsequent search input associated with a digital form;
        generating an input embedding vector that represents the subsequent search input in the latent space using the machine learning model;
        identifying a candidate embedding vector included in the group of candidate embedding vectors based on a distance between the input embedding vector and the identified candidate embedding vector in the latent space; and generating an indication of a search output associated with the digital form for display in a user interface based on the identified candidate embedding vector.

10. The system as described in claim 9, wherein the form data is labeled with intent information or natural language descriptions.

11. The system as described in claim 9, wherein the search input is a natural language search query.

12. The system as described in claim 9, wherein the operations further comprise generating a further indication of an additional form element for display in the user interface based on a form element included in the digital form.

13. The system as described in claim 12, wherein the additional form element is at least one of a field or a fragment.

14. The system as described in claim 12, wherein the additional form element is identified using a collaborative filtering model.

15. The system as described in claim 9, wherein the operations further comprise:

representing the digital form as a sequence of elements; and identifying an additional form element based on the sequence of elements using a collaborative filtering model.

16. A non-transitory computer-readable storage medium storing executable instructions, which when executed by a processing device, cause the processing device to perform operations comprising:

receiving form data describing a plurality of different digital forms;

identifying, based on the form data, a plurality of candidate search outputs for a plurality of search inputs;

generating a group of candidate embedding vectors in a latent space corresponding to the plurality of candidate search outputs, the generating performed using a machine learning model;

receiving input data describing an interaction relative to a digital form displayed in a user interface of an application for editing digital forms;

generating an input embedding vector that represents the interaction in the latent space using the machine learning model;

identifying a candidate embedding vector included in the group of candidate embedding vectors based on a distance between the input embedding vector and the identified candidate embedding vector in the latent space; and generating an indication of a form element for display in the user interface based on the identified candidate embedding vector.

17. The non-transitory computer-readable storage medium as described in claim 16, wherein the operations further comprise:

representing the digital form as a sequence of elements; and identifying an additional form element based on the sequence of elements using a collaborative filtering model trained on additional training data to identify form elements for digital forms.

18. The non-transitory computer-readable storage medium as described in claim 16, wherein the form element is at least one of a field or a fragment.

19. The non-transitory computer-readable storage medium as described in claim 16, wherein the form data is labeled with intent information or natural language descriptions.

\* \* \* \* \*